United States Patent
Wang et al.

(10) Patent No.: US 11,088,765 B2
(45) Date of Patent: *Aug. 10, 2021

(54) METHODS AND APPARATUS FOR DETECTING AND COMPENSATING BANDWIDTH LIMITATION AND MODULATION NONLINEARITY OF A COHERENT OPTICAL TRANSPONDER

(71) Applicant: Juniper Networks, Inc., Sunnyvale, CA (US)

(72) Inventors: Qiang Wang, San Carlos, CA (US); Yang Yue, Milpitas, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/737,606

(22) Filed: Jan. 8, 2020

(65) Prior Publication Data

US 2020/0145112 A1 May 7, 2020

Related U.S. Application Data

(63) Continuation of application No. 16/008,713, filed on Jun. 14, 2018, now Pat. No. 10,536,221.

(51) Int. Cl.
*H04B 10/08* (2006.01)
*H04B 17/00* (2015.01)
(Continued)

(52) U.S. Cl.
CPC ......... *H04B 10/616* (2013.01); *H04B 10/073* (2013.01); *H04B 10/07955* (2013.01)

(58) Field of Classification Search
CPC .................................................. H04B 10/616
See application file for complete search history.

(56) References Cited

U.S. PATENT DOCUMENTS 5,309,532 A * 5/1994 Chang ................... G02F 1/3132
  385/3
8,948,614 B1 * 2/2015 Schmidt ............... H04B 10/616
  398/208

(Continued)

FOREIGN PATENT DOCUMENTS

EP      3012984 A1    4/2016
WO   WO 2017/106057   6/2017

OTHER PUBLICATIONS

Ginni Khanna, "A Robust Adaptive Pre-Distortion Method for Optical Communication Transmitters", Apr. 1, 2016, IEEE Photonics Technology Letters, vol. 28, No. 7, All pages (Year: 2016).*

(Continued)

*Primary Examiner* — Pranesh K Barua
(74) *Attorney, Agent, or Firm* — Cooley LLP

(57) ABSTRACT

In some embodiments, an apparatus includes a memory and a processor operatively coupled to the memory. The processor is configured to send a stimulus signal at a frequency that corresponds to a first frequency value to a tributary channel of a coherent optical transponder. The processor is configured to adjust an amplitude of the stimulus signal and receive a first plurality of output optical power values. The processor is configured to adjust the frequency of the stimulus signal and receive a second plurality of output optical power values. The processor is configured to determine a bandwidth limitation and a modulation nonlinearity, and then send a first signal to a first filter to reduce the bandwidth limitation and a second signal to a second filter to reduce the modulation nonlinearity.

18 Claims, 10 Drawing Sheets

(51) Int. Cl.
*H04B 10/61* (2013.01)
*H04B 10/073* (2013.01)
*H04B 10/079* (2013.01)

(56) References Cited

U.S. PATENT DOCUMENTS

| | | | |
|---|---|---|---|
| 9,553,742 B1* | 1/2017 | Xu | H04L 25/0384 |
| 9,749,060 B1* | 8/2017 | Wang | H04B 10/614 |
| 9,979,472 B1 | 5/2018 | Wang et al. | |
| 10,038,498 B1* | 7/2018 | Fan | H04B 10/5053 |
| 2003/0103200 A1* | 6/2003 | Stadler | G01M 11/335 |
| | | | 356/73.1 |
| 2005/0013337 A1* | 1/2005 | Jung | H01S 5/4006 |
| | | | 372/50.1 |
| 2005/0286825 A1* | 12/2005 | Gill | H04B 10/505 |
| | | | 385/3 |
| 2006/0008278 A1* | 1/2006 | Kao | H04B 10/5162 |
| | | | 398/188 |
| 2009/0047028 A1* | 2/2009 | Terahara | H04B 10/505 |
| | | | 398/188 |
| 2009/0191923 A1* | 7/2009 | Fudaba | H03F 1/0211 |
| | | | 455/571 |
| 2012/0121256 A1* | 5/2012 | Suzuki | H04B 10/07957 |
| | | | 398/34 |
| 2013/0141772 A1* | 6/2013 | Jiang | H04B 10/50575 |
| | | | 359/276 |
| 2013/0148981 A1* | 6/2013 | Yasuda | H04B 10/50575 |
| | | | 398/185 |
| 2013/0223849 A1* | 8/2013 | Whiteaway | H04B 10/541 |
| | | | 398/141 |
| 2014/0037286 A1* | 2/2014 | Krasulick | H04B 10/5561 |
| | | | 398/38 |
| 2014/0233963 A1* | 8/2014 | Le Taillandier De Gabory | H04B 10/541 |
| | | | 398/183 |
| 2014/0233965 A1* | 8/2014 | Kim | H04B 10/5053 |
| | | | 398/188 |
| 2016/0156418 A1* | 6/2016 | Yamanaka | H04B 10/5561 |
| | | | 398/38 |
| 2016/0173304 A1* | 6/2016 | Le Taillandier De Gabory | H04L 25/06 |
| | | | 398/76 |

OTHER PUBLICATIONS

Yanyang Zhou, "Linearity Measurement and Pulse Amplitude Modulation in a Silicon Single-Drive Push-Pull Mach-Zehnder Modulator", Jul. 15, 2016, Journal of Lightwave Technology, vol. 24, No. 14, All pages (Year: 2016).*
Extended European Search Report for European Application No. 19165649.5, dated Nov. 25, 2019, 10 pages.
Li, Y. et al., "High Linearity InP-Based Phase Modulators Using a Shallow Quantum-Well Design," IEEE Photonics Technology Letters, vol. 22, No. 18, Sep. 15, 2010, pp. 1340-1342.
Zhou, Y. et al., "Linearity Measurement and Pulse Amplitude Modulation in a Silicon Single-Drive Push-Pull Mach-Zehnder Modulator," Journal of Lightwave Technology, vol. 34, No. 14, Jul. 15, 2016, pp. 3323-3329.
Berenguer, P. W. et al., "Nonlinear Digital Pre-distortion of Transmitter Components," Journal of Lightwave Technology, vol. 34, No. 8, Apr. 15, 2016, pp. 1739-1745.
Khanna, G. et al., "A Robust Adaptive Pre-Distortion Method for Optical Communication Transmitters," IEEE Photonics Technology Letters, vol. 28, No. 7, Apr. 1, 2016, pp. 752-755.
Ke, J. H. et al., "400 Gbit/s single-carrier and 1 Tbit/s threecarrier superchannel signals using dual polarization 16-QAM with look-up table correction and optical pulse shaping," Optics Express, Jan. 13, 2014, vol. 22, No. 1, pp. 71-83.
Duthel, T. et al., "Characterization and Pre-Distortion of Linear and Non-Linear Transmitter Impairments for PM-64QAM Applications," ECOC 2016, 42nd European Conference and Exhibition on Optical Communications • Sep. 18-22, 2016 • Düsseldorf, pp. 785-787.
Raybon, G. et al., "180-GBaud All-ETDM Single-Carrier Polarization Multiplexed QPSK Transmission over 4480 km," OFC 2018, OSA 2018, 3 pages.
Olsson, S. L. I. et al., "Record-High 17.3-bit/s/Hz Spectral Efficiency Transmission over 50 km Using Probabilistically Shaped PDM 4096-QAM," OFC 2018, OSA 2018, 3 pages.
Maher, R. et al., "Constellation Shaped 66 GBd DP-1024QAM Transceiver with 400 km Transmission over Standard SMF," IEEE, 2017, 3 pages.
Going, R. et al., "Multi-channel InP-based Coherent PICs with Hybrid Integrated SiGe Electronics Operating up to 100 GBd, 32QAM," IEEE, 2017, 3 pages.
Wang, Q. et al., "Detection and compensation of bandwidth limitation and modulation nonlinearity in coherent IQ transmitter," 2018 European Conference on Optical Communication (ECOC), IEEE, Sep. 2018, pp. 1-3.

* cited by examiner

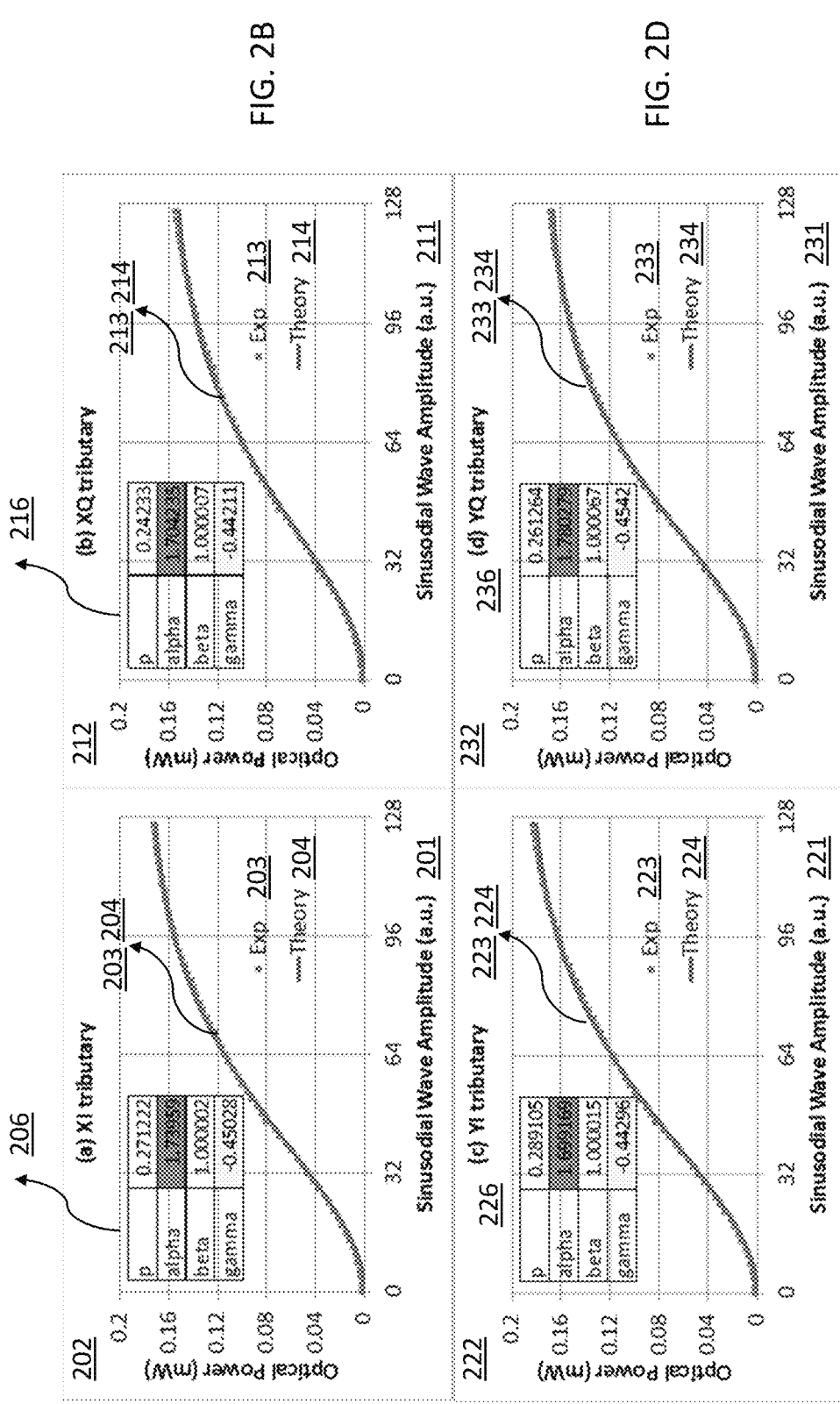

METHODS AND APPARATUS FOR DETECTING AND COMPENSATING BANDWIDTH LIMITATION AND MODULATION NONLINEARITY OF A COHERENT OPTICAL TRANSPONDER

CROSS-REFERENCE TO RELATED APPLICATION

This application is a continuation of U.S. patent application Ser. No. 16/008,713, now U.S. Pat. No. 10,536,221, filed on Jun. 14, 2018, and entitled "Methods and Apparatus for Detecting and Compensating Bandwidth Limitation and Modulation Nonlinearity of a Coherent Optical Transponder," the disclosure of which is incorporated herein by reference in its entirety.

BACKGROUND

Some embodiments described herein relate generally to methods and apparatus for improving the performance of a coherent optical transponder in an optical communication system. In particular, but not by way of limitation, some embodiments described herein relate to methods and apparatus for detecting and compensating bandwidth limitation and modulation nonlinearity of a coherent optical transponder in an optical communication system.

With a growing demand of optical communication systems with high data rates capability, optical quadrature amplitude modulation (QAM) signals are generated to provide high data-carrying capacity and high spectral efficiency. Quadrature amplitude modulation (QAM) is a modulation technique where two or more binary or multi-level electrical data signals are modulated, via an in-phase, or "I" channel, and a quadrature (90 degree) phase, or "Q" channel, onto a single optical carrier wave such that both the amplitude and the phase of the optical carrier wave are modulated with data to enhance the efficiency of the spectral occupancy. Other modulation techniques include binary phase-shift keying (BPSK), quadrature phase-shift keying (QPSK), differential quadrature phase-shift keying (DQPSK), and on-off keying (OOK). Polarization multiplexing (PM) is a multiplexing technique where two independent electrical data signals are first modulated onto an optical carrier wave having orthogonal polarizations (e.g., a first electrical data signal is modulated onto an X channel polarization and a second electrical data signal is modulated onto a Y channel polarization), then the signal on two polarizations are further multiplexed together through a polarization beam combiner so that the overall data throughput is doubled without doubling the spectral bandwidth.

A typical dual-polarization QAM (DP-QAM) transponder includes four tributary channels, XI, XQ, YI, and YQ, which are used for in-phase and quadrature modulation for both an X channel polarization and a Y channel polarization. Within each tributary, a bandwidth limitation may result from various components within the optical transponder, for example, the digital-to-analog converter (DAC), the radio frequency (RF) traces in the print circuit board (PCB), the pluggable interface (if applicable), the RF electrical amplifier, and/or the optical modulator. In addition to the bandwidth limitation, a modulation nonlinearity may result from a transfer function of the optical modulator and/or a nonlinear amplitude response from the various components within the optical transponder.

Known solutions to compensate the bandwidth limitation do not produce satisfying results for an optical transponder with a high baud rate (e.g., >400 G) or with a high amplitude signal. In addition, the known solutions often measure the coupled effects of the bandwidth limitation and the modulation nonlinearity and thus, the compensation lacks accuracy. Known solutions to compensate the modulation nonlinearity often compensate effects from either the transfer function of the optical modulator or the nonlinear amplitude response, and thus lack satisfying results.

Accordingly, a need exists for methods and apparatus to measure and compensate the de-coupled effects of the bandwidth limitation and the modulation nonlinearity of a high baud rate optical transponder. In addition, a need exists for methods and apparatus to compensate the modulation nonlinearity by compensating the transfer function of the optical modulator as well as the nonlinear amplitude response of the optical transponder.

SUMMARY

In some embodiments, an apparatus includes a memory configured to store a stimulus signal having a plurality of amplitude values and a plurality of frequency values and a processor operatively coupled to the memory. The processor is configured to send the stimulus signal at a frequency that corresponds to a first frequency value from the plurality of frequency values to a tributary channel from a set of tributary channels of a coherent optical transponder. The processor is configured to adjust an amplitude of the stimulus signal between a first amplitude value and a second amplitude value. The plurality of amplitude values includes the first amplitude value and the second amplitude value. The processor is configured to receive a first plurality of output optical power values in response to the amplitude of the stimulus signal adjusting between the first amplitude value and the second amplitude value. The processor is configured to adjust the frequency of the stimulus signal between a second frequency value and a third frequency value. The plurality of frequency values includes the second frequency value and the third frequency value. The processor is configured to receive a second plurality of output optical power values in response to the frequency of the stimulus signal adjusting between the second frequency value and the third frequency value. The processor is configured to determine, based on the first plurality of output optical power values and the second plurality of output optical power values, a bandwidth limitation associated with the tributary channel of the coherent optical transponder and a modulation nonlinearity associated with the tributary channel of the coherent optical transponder. The processor is configured to send a first signal to a first filter of the coherent optical transponder to reduce the bandwidth limitation associated with the tributary channel, and send a second signal to a second filter of the coherent optical transponder to reduce the modulation nonlinearity associated with the tributary channel.

BRIEF DESCRIPTION OF THE DRAWINGS

FIGS. 2A-2D show an example of the total output power of an output signal from each tributary channel of an optical transponder, respectively, as a function of an amplitude of a stimulus signal, according to an embodiment.

DETAILED DESCRIPTION

Figure 1A:
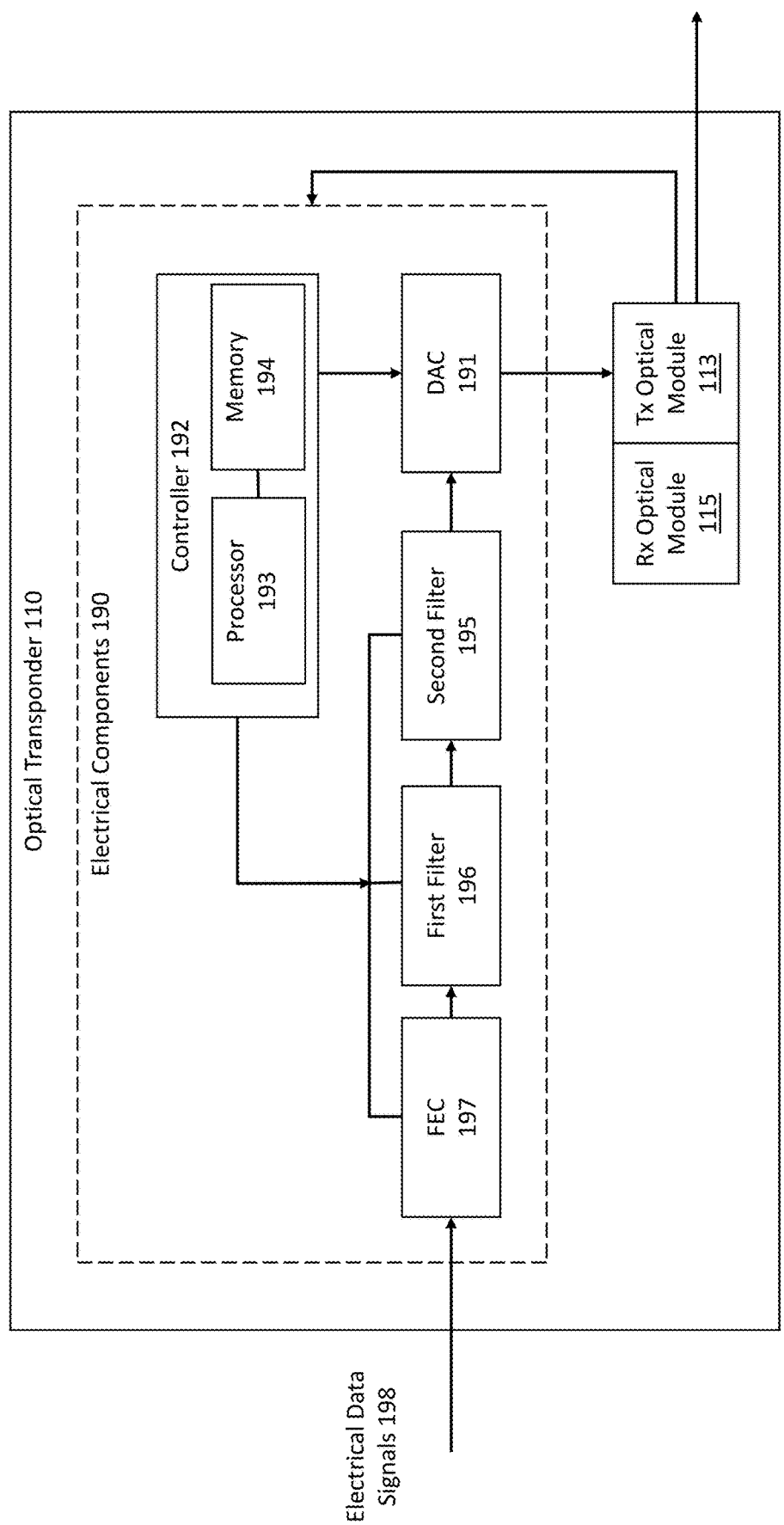
FIGS. 1A-1B are block diagrams illustrating an optical transponder, according to an embodiment.

Polarization multiplexing (PM) is a modulation technique where an optical carrier wave may have different optical polarizations that are independently and simultaneously modulated via electrical signals (e.g., information and/or data). The different polarizations may include a first polarization channel, "X channel," and a second polarization channel, "Y channel," and the X channel and the Y channel may be orthogonal (or approximately orthogonal) to one another. For example, the X channel may be horizontally polarized light, and the Y channel may be vertically polarized light. In some instances, the X and Y channels need not be horizontal and vertical polarizations, and need not be orthogonal.

Quadrature amplitude modulation (QAM) is a modulation technique where two or more binary or multi-level electrical data signals are modulated, via an in-phase, or "I" channel, and a quadrature (90 degree or approximately 90 degree) phase, or "Q" channel, onto a single optical carrier wave such that both its amplitude and phase are modulated with data to enhance the efficiency of the spectral occupancy. In M-ary QAM (mQAM or M-QAM), one symbol may represent multiple bits to enhance spectral efficiency. Other modulation techniques include binary phase-shift keying (BPSK), quadrature phase-shift keying (QPSK), differential quadrature phase-shift keying (DQPSK), and on-off keying (OOK).

An optical modulator may use polarization multiplexing to combine two different QAM signals into a dual-polarization QAM (DP-QAM) signal with an in-phase horizontal polarization, or "XI" channel, a quadrature horizontal polarization, or "XQ" channel, an in-phase vertical polarization, or "YI" channel, and a quadrature vertical polarization, or "YQ" channel, thereby improving spectral efficiency relative to a single QAM signal. Similarly, an optical modulator may use polarization multiplexing to combine two different QPSK signals into a dual-polarization QPSK (DP-QPSK), thereby improving spectral efficiency relative to a single QPSK signal.

In some embodiments, an apparatus includes a memory configured to store a stimulus signal having a plurality of amplitude values and a plurality of frequency values and a processor operatively coupled to the memory. The processor is configured to send the stimulus signal at a frequency that corresponds to a first frequency value from the plurality of frequency values to a tributary channel from a set of tributary channels of a coherent optical transponder. The processor is configured to adjust an amplitude of the stimulus signal between a first amplitude value and a second amplitude value. The plurality of amplitude values includes the first amplitude value and the second amplitude value. The processor is configured to receive a first plurality of output optical power values in response to the amplitude of the stimulus signal adjusting between the first amplitude value and the second amplitude value. The processor is configured to adjust the frequency of the stimulus signal between a second frequency value and a third frequency value. The plurality of frequency values includes the second frequency value and the third frequency value. The processor is configured to receive a second plurality of output optical power values in response to the frequency of the stimulus signal adjusting between the second frequency value and the third frequency value. The processor is configured to determine, based on the first plurality of output optical power values and the second plurality of output optical power values, a bandwidth limitation associated with the tributary channel of the coherent optical transponder and a modulation nonlinearity associated with the tributary channel of the coherent optical transponder. The processor is configured to send a first signal to a first filter of the coherent optical transponder to reduce the bandwidth limitation associated with the tributary channel, and send a second signal to a second filter of the coherent optical transponder to reduce the modulation nonlinearity associated with the tributary channel.

As used in this specification, the singular forms "a," "an" and "the" include plural referents unless the context clearly dictates otherwise. Thus, for example, the term "an optical modulator" is intended to mean a single optical modulator or multiple optical modulators. For another example, the term "a filter" is intended to mean a single filter or multiple filters.

Figure 1B:
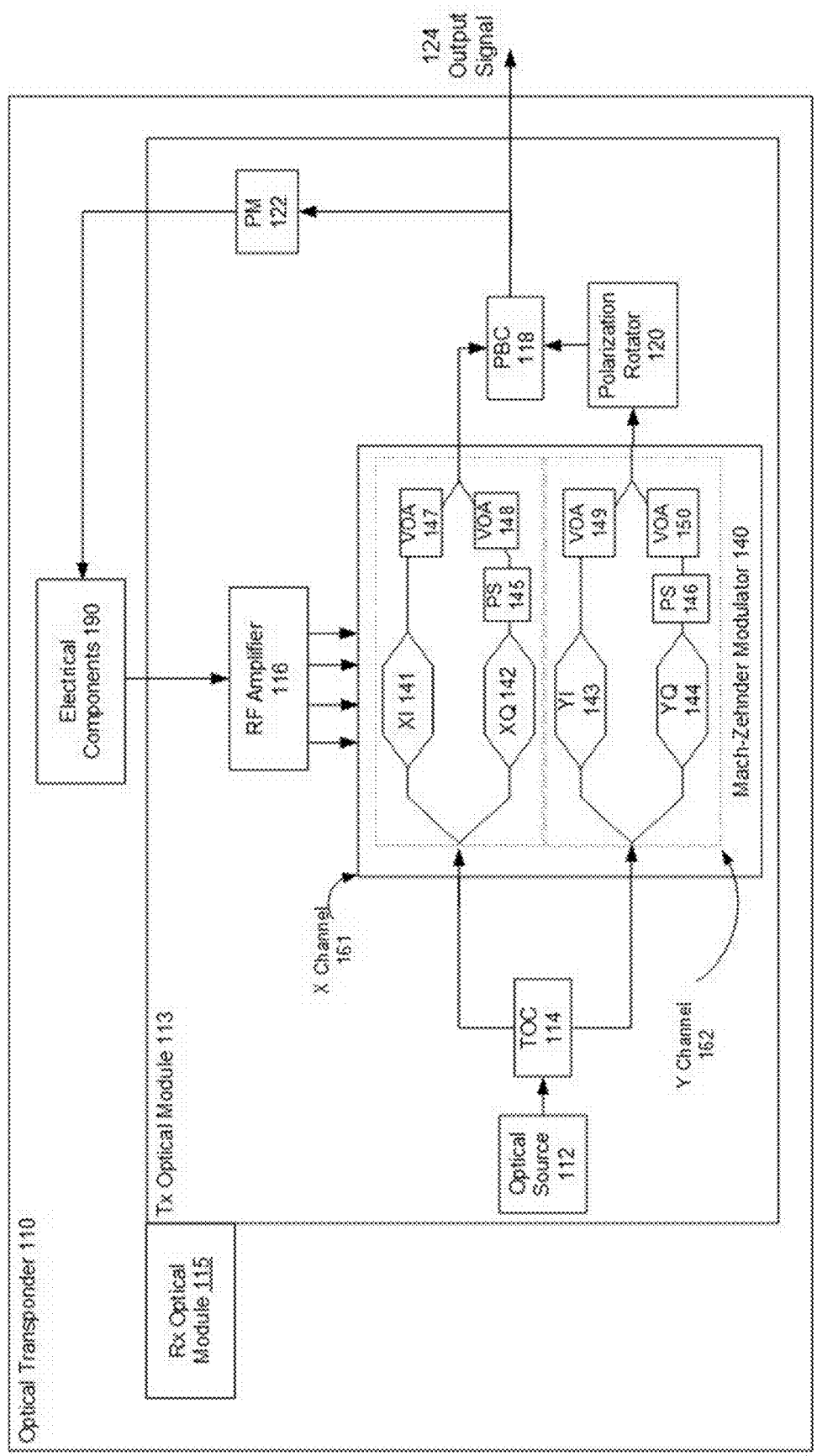

FIGS. 1A-1B are block diagrams illustrating an optical transponder, according to an embodiment. The optical transponder 110 can be configured to produce, transmit, and/or receive optical signals. In some instances, the optical transponder 110 can be used in an optical communication system (not shown) such as a wavelength division multiplexing (WDM) system, including a dense wavelength division multiplexing (DWDM) system. The optical communication system (not shown) can include a set of electrical devices and a set of optical devices.

The optical transponder 110 can be configured to produce, transmit and/or receive an optical signal. The optical transponder 110 is, in some embodiments described herein, referred to as an optical transmitter. The optical transponder 110 can be a hardware module in the optical communication system. The optical transponder 110 can be any high data rate (e.g., 100 Gbps) optical transponder such as a transponder implementing intensity modulation with direct detection, e.g., a coherent optical transponder, a coherent optical M-ary quadrature amplitude modulation (M-QAM) transponder, a coherent polarization-multiplexed (PM) M-QAM transponder, and/or the like. In coherent optical communication systems with a coherent optical transponder, both magnitude and phase information are used to transmit and receive data such as for phase-shift keying modulation (e.g., BPSK, PM-BPSK, QPSK, PM-QPSK) or quadrature amplitude modulation (e.g., M-QAM, or PM-M-QAM). For example, the optical transponder 110 may include a laser diode, a semiconductor laser, a continuous wave laser, and/or an optical modulator that may receive an electrical signal, and modulate, based on the electrical signal, an optical signal for transmission over optical link (not shown).

The optical transponder 110 can include a transmitter (Tx) optical module 113, a receiver (Rx) optical module 115, and a set of electrical components 190. The set of electrical components 190 can include, but are not limited to, a forward error correction (FEC) encoder 197, a first filter 196 (e.g., a finite impulse response (FIR) filter), a second filter 195 (e.g., a Volterra filter), a digital-analog converter (DAC) 191, and a controller 192 having a processor 193 and a memory 194. One or more components of the optical transponder 110 can be implemented using free-space optics, fiber optics, integrated optics (e.g., Si, SiN, Silica, III-V, etc. optics), or the like. Each component of the optical transponder 110 can be operatively coupled to another component of optical transponder 110.

The controller 192 can be or can include a general purpose processor, a field-programmable gate array (FPGA), an application specific integrated circuit (ASIC), a combination thereof, or other equivalent integrated or discrete logic circuitry. In some implementations, the controller 192 can be disposed on a digital signal processor (DSP) and coupled with other electrical components (e.g., the FEC encoder 197, the first filter 196, the second filter 195, the DAC 191, and/or the like) on the DSP. The controller 192 can include a processor 193, and a memory 194 operatively coupled to the processor 193. In some implementations, the controller 192 can include components and/or circuitry configured to control properties of an optical signal and/or send control signals to one or more components of the optical transponder 110. For example, the controller 192 can send control signals to and thus control properties of one or more electrical components (e.g., DAC 191, the first filter 196, the second filter 195, and the FEC Encoder 197) and/or one or more components within the Tx optical module 113 and/or the Rx optical module 115. In some implementations, controller 192 is a hardware device and/or software (executed on a processor) external to the optical transponder 110. In other implementations, controller 192 is a hardware device and/or software (executed on a processor) implemented within the optical transponder 110.

The processor 193 can be or include any processing device or component configured to perform the data collecting, processing and transmitting functions as described herein. The processor 193 can be configured to, for example, write data into and read data from the memory 194, and execute the instructions stored within the memory 194. Processor 193 can also be configured to execute and/or control, for example, the operations of the memory 194. In some implementations, based on the methods or processes stored within the memory 194, the processor 193 can be configured to execute the bandwidth limitation and the modulation nonlinearity compensation process as described in in FIG. 8.

The memory 194 can be, for example, a random-access memory (RAM) (e.g., a dynamic RAM, a static RAM), a flash memory, a removable memory, and/or so forth. In some embodiments, the memory 194 can include, for example, a database, process, application, virtual machine, and/or some other software modules (stored and/or executing in hardware) or hardware modules configured to execute a bandwidth limitation and the modulation nonlinearity compensation process as described further herein. In such implementations, instructions of executing the bandwidth limitation and the modulation nonlinearity compensation process and/or the associated methods can be stored within the memory 194 and executed at the processor 193.

In some implementations, the DAC 191, the first FIR 196, the second filter 195, and the FEC encoder 197 can be included in a DSP (not shown in the figure). The DSP can be, can include, or can be included within a general purpose processor, a microprocessor, a system in package (SIP block), a field-programmable gate array (FPGA), an application specific integrated circuit (ASIC), a combination thereof, or other equivalent integrated or discrete logic circuitry. The DSP can perform signal processing such as spectral shaping, equalizing for optical and electrical impairments, and other such signal processing for various needs. The DSP can receive control signals from controller 192 and send electrical signals to the Tx optical module 113. In some implementations, the DSP can be a hardware device external to the Tx optical module 113. In other implementations, the DSP can be a hardware device within the Tx optical module 113.

The FEC encoder 197 can be, include, or be included within a general purpose processor, a microprocessor, a field-programmable gate array (FPGA), an application specific integrated circuit (ASIC), a combination thereof, or other equivalent integrated or discrete logic circuitry. The FEC encoder 197 can be configured to correct errors in data transmission over unreliable or noisy communication channels to improve data reliability. The FEC encoder 197 can receive electrical data signals as input (198) from an electrical circuit (e.g., a network processor located upstream) (not shown in the figure). The FEC encoder 197 can then encode the data signals with redundant error-correction information (e.g., redundant parity symbols), and ultimately send the encoded data signals to an optical receiver (not shown). Based on the redundant error-correction information, the optical receiver can then detect and correct errors that occur during the data transmission. Specifically, for example, the FEC encoder 197 can receive a set of electrical signals 198 (having data signals and/or data packets) from an electrical interface (not shown) of the optical transponder 110 (or from a controller 192), and encode the set of electrical signals based on a pre-determined algorithm. The FEC encoder 197 can generate FEC overhead bits and add the FEC overhead bits to a payload of an electrical signal. The FEC overhead bits are encoded such that the optical receiver (not shown) can use the information within the FEC overhead bits to detect and correct bit errors in the payload of the electrical signal received by the optical receiver (not shown) after converting the related optical signal. Bit errors may be incurred in the transmission path between the optical transponder 110 and optical receiver (not shown).

The first filter 196 is a digital filter that uses a digital signal processing technique. In some instances, the first filter 196 can be a finite impulse response (FIR) filter, which has an impulse response that is of finite duration, because it settles to zero in finite time. The first filter 196 can receive signals from the FEC encoder 197 and send an output signal to the second filter 195 or the DAC 191. Details of the first filter 196, according to an embodiment, are described with respect to FIG. 7A.

Pulse shaping is a process of changing a waveform of a transmitted signal to reduce intersymbol interference ("ISI"). The ISI is a distortion of a signal in which one symbol interferes with subsequent symbols, causing a signal receiver's failure to reliably distinguish between individual symbols. In some instances, pulse shaping can be achieved by using transmitter filters (e.g., the first filter 196 and the second filter 195.) A first filter 196 (e.g., the FIR filter) can be, for example, a Nyquist filter. An ideal Nyquist filter can be a brick-wall Nyquist filter (i.e., rectangular shape in a frequency domain). Such a filter produces a Nyquist filtered stream of symbols that is free of ISI when the symbol rate is less than or equal to the Nyquist frequency. In practice, however, a brick-wall Nyquist filter cannot be achieved because the response of an ideal Nyquist filter continues for all time. In practice, the filter characteristics of a brick-wall Nyquist filter can be approximated with a raised cosine filter. The time response of a raised cosine filter falls off much faster than the time response of a Nyquist pulse. Such filters produce a filtered stream of symbols that is free of ISI when the symbol rate is less than or equal to the Nyquist frequency. Some ISI can be introduced when the stream of symbols is detected across a channel. In some instances, the filter characteristics of a brick-wall Nyquist filter can also be approximated with a root raised cosine filter. In some instances, both the optical transmitter and the optical receiver can implement the root raised cosine filter. Thus, the filter shape of the optical transmitter can substantially match the filter shape of the optical receiver, which significantly improves the signal to noise ratio (SNR).

The second filter 195 is a digital filter that uses a digital signal processing technique. The second filter 195 can receive signals from the first filter 196 or the FEC encoder 197 and send an output signal to the DAC 191. In some instances, the second filter 195 can be a Volterra filter, which suppresses a nonlinear distortion component of the electrical signal based on the Volterra Series. The Volterra filter can include a set of filter operation units for a multi-degree filtering process. For example, the Volterra filter can include a filter operation unit for a linear term of the Volterra Series, a filter operation unit for the quadratic term of the Volterra Series, and a filter operation unit for the cubic term of the Volterra Series, and/or the like. Details of the second filter 195, according to an embodiment, are described with respect to FIG. 7B.

The DAC 191 can receive signals from the first filter 196 and/or the second filter 195 and convert those signals to analog electrical signals. The analog electrical signals can then be sent to the Tx optical module 113. In some implementations, the output from the DAC 191 can be further sent through a pluggable connector (not shown), and/or a radio frequency (RF) trace (not shown), and ultimately to an RF amplifier (shown as 116 in FIG. 1B). In some implementations, the DAC 191 can switch receiving signals from the controller 192 or the other components of the DSP (e.g., the FEC encoder 197, the first filter 196, the second filter 195.) For example, during a calibration phase/mode (e.g., initial power-up with no live traffic, module reconfiguration, module switching to a new channel, wavelength adjustment, maintenance window, and/or the like) of the optical transponder 110, the DAC 191 can receive a stimulus signal from the controller 192 (the processor 193 or the memory 194). In some instances, during the calibration phase/mode, the DAC 191 does not receive data signals from the other components of the DSP (e.g., the FEC encoder 197, the first filter 196, the second filter 195.) During a signal transmission phase (e.g., with live data traffic) of the optical transponder 110, the DAC 191 can receive data signals from the other components of the DSP (e.g., the FEC encoder 197, the first filter 196, the second filter 195) and not receive the stimulus signal from the controller 192. In some instances, the DAC 191 can receive the data signals from the other components of the DSP (e.g., the FEC encoder 197, the first filter 196, the second filter 195), while receiving the stimulus signal from the controller 192.

The Tx optical module 113 can receive electrical signals (i.e., data signals) from the DAC 191 of the electrical components 190 and output an optical signal(s) to an optical device in the optical communication system. The Tx optical module 113 can include an optical source (not shown) and a Mach-Zehnder Modulator ("Modulator" or "MZM") (not shown). In some implementations, the MZM (not shown) can modulate an optical signal output from the optical source (not shown) with the electrical signals received from the DAC 191 to produce modulated optical signals. Details of the Tx optical module 113 are described with respect to FIG. 1B.

The Rx optical module 115 can receive an optical signal from an optical receiver (not shown) via an optical link (not shown). For example, the Rx optical module 115 can include a photodetector and/or a photodiode that can detect an optical signal received, and can convert the optical signal into an electrical signal. In some implementations, the Rx optical module 115 can include a device capable of de-modulating an optical signal. In some implementations, the Rx optical module 115 can include a device capable of controlling properties associated with an optical signal and/or a de-modulator. The Rx optical module 115 can be operatively coupled to the controller 192, a receiving finite impulse filter (Rx FIR, not shown), an FEC decoder (not shown), and/or a digital signal processor (DSP, not shown).

FIG. 1B is a block diagram illustrating the Tx optical module 113 of the optical transponder 110, according to an embodiment. The Tx optical module 113 can receive electrical signals from the one or more electrical components 190 and output an optical signal(s) 124 to an optical device (not shown) in the optical communication system (not shown). The Tx optical module 113 can include an optical source 112, a tunable optical coupler (TOC) 114, a radio frequency (RF) amplifier 116, a polarization beam combiner (PBC) 118, a polarization rotator 120, a power meter 122, and a Mach-Zehnder Modulator ("Modulator" or "MZM) 140. In some implementations, the MZM 140 can include a set of tributary modulators 141-144, a set of variable optical attenuators/amplifiers (VOAs) (147, 148, 149, 150), and a set of phase shifters (PS) (145, 146). In some implementations, the Tx optical module 113 can also include a polarizer (not shown), a polarization controller (not shown), and/or a polarization splitter (not shown).

Optical source 112 can include a device capable of producing and/or transmitting an optical output (or an optical beam). For example, optical source 112 can include a laser diode, a semiconductor laser, and/or a continuous wave laser. Optical source 112 can be any type of laser that is usable for high bit rate optical signal transmission, for example, a narrow linewidth laser in the 1550 nm wavelength range (so-called C-Band), but can be tuned to or implemented for any wavelength.

TOC 114 can include a device and/or circuitry capable of controlling a coupling ratio of optical input portions. For example, TOC 114 can receive an optical output from optical source 112 and cause a first portion of the optical signal to be provided to a first tributary modulator (e.g., an X channel modulator applied to an X channel 161) and a second portion of the optical signal to be provided to a second tributary modulator (e.g., a Y channel modulator applied to a Y channel 162) with a particular ratio of the first portion to the second portion. In some implementations, TOC 114 can adjust the coupling ratio based on a control signal. For example, based on receiving a control signal from a controller within the electrical components 190, TOC 114 can adjust the coupling ratio to increase the first portion relative to the second portion, decrease the first portion relative to the second portion, or the like, thereby reducing a power imbalance of portions of the optical signal. In some implementations, TOC 114 can be included in a beam splitter (not shown) or another device (not shown) capable of splitting the optical signal or a portion thereof.

MZM 140 can modulate an optical signal received from TOC 114 with a set of electrical data signals received from RF amplifier 116. For example, MZM 140 can produce a modulated signal, which can vary one or more properties (e.g., amplitude/intensity, phase, frequency/wavelength, polarization, etc.) of an output (e.g., a carrier wave) produced by optical source 112. In some implementations, MZM 140 can include or be replaced with an indium phosphide semiconductor-based modulator, an electro-absorption modulator, a phase modulator, an intensity modulator (e.g., an OOK modulator), a return to zero (RZ) modulator, a non-return to zero (NRZ) modulator, a PSK modulator, a binary PSK (BPSK) modulator, a Quad PSK (QPSK) modulator, a QAM modulator, an M-ary QAM (M-QAM) modulator, any polarization multiplexed (PM) versions of the above listed modulators (e.g., a DPBPSK modulator, a DPQAM modulator, or the like), and/or any other modulator or combination of modulators. In some embodiments, MZM 140 can receive a control signal from the controller within the electrical components 190, and can adjust the operating condition of MZM 140 using the control signal.

In some implementations, MZM 140 can include a set of tributary modulators 141-144. Each tributary modulator from the set of tributary modulators 141-144 can modulate an optical output (or an optical beam) from the TOC 114 in the corresponding tributary channel from a set of tributary channels 141-144. For example, MZM 140 can include an X channel modulator 161 and a Y channel modulator 162. The X channel modulator 161 can include an XI channel modulator 141, an XQ channel modulator 142, an X channel phase shifter 145, and optional VOAs 147 and 148. The Y channel modulator 162 can include a YI channel modulator 143, a YQ channel modulator 144, a Y channel phase shifter 146, and optional VOAs 149 and 150. The XI channel modulator 141 can modulate an optical signal in the XI tributary channel; the XQ channel modulator 142 can modulate an optical signal in the XQ tributary channel; the YI channel modulator 143 can modulate an optical signal in the YI tributary channel; the YQ channel modulator 144 can modulate an optical signal in the YQ tributary channel.

In some embodiments, MZM can include a QAM modulator (not shown) with two tributary modulators, one to modulate signals on the I channel, and one to modulate signals on the Q channel. An optical coupler can combine the signals at the I and Q channels to generate the output signal. Alternatively, MZM can include two tributary modulators, one to modulate signals at the X polarization, and one to modulate signals at the Y polarization. For the embodiment shown in FIG. 1B, the MZM 140 can combine the signals at the X and Y polarizations to generate the output signal. For example, MZM 140 can include a dual polarization-QAM (DP-QAM) modulator (as shown in FIG. 1B) with four tributary modulators 141-144, one to modulate signals at the XI channel, one to modulate signals at the XQ channel, one to modulate signals at the YI channel, and one to modulate signals at the YQ channel.

The output optical signal from at least one of the tributary channels (e.g., from XQ channel modulator 142, or YQ channel modulator 144) can be phase shifted to a particular phase with respect to another tributary channel by a phase shifter, such as X channel phase shifter 145, Y channel phase shifter 146, and/or the like. For example, the output optical signal of XQ channel modulator 142 can be phase shifted by X channel phase shifter 145 with respect to another output optical signal of XI channel modulator 141. In some implementations, X channel phase shifter 145 and/or Y channel phase shifter 146 can apply a particular phase shift (e.g., a 0 degree phase shift, a 90 degree phase shift, a 180 degree phase shift, or the like) to one of an XI channel or an XQ channel and/or one of a YI channel or a YQ channel, respectively.

VOAs 147-150 can be or include a device to control an optical power of an optical signal. For example, VOA 147 can receive an optical signal and can amplify or attenuate the optical signal to alter the optical power of the optical signal. In some implementations, VOA 147 can alter the optical power of the optical signal based on a control signal. For example, based on receiving a control signal from the controller within the electrical components 190, VOA 147 can alter a level of amplification or attenuation of the optical signal or a portion thereof to reduce a power imbalance between portions of the optical signal. In some implementations, one or more VOAs 147-150 can be optionally included or excluded from MZM 140.

The optical signal output from at least one of the tributary channels (e.g., from Y channel modulator 162) can be rotated to a particular polarization by polarization rotator 120. In some implementations, polarization rotator 120 may rotate the output optical signal from at least one of the tributary channels such that the output signal from X channel modulator 161 and the output signal from Y channel modulator 162 are orthogonal (or approximately orthogonal).

Polarization beam combiner (PBC) 118 can combine optical signals from each tributary channel and produce an output signal 124. For example, PBC 118 can receive optical signals from polarization rotator 120, which rotates optical signals from Y channel modulator 162. PBC 118 can also receive optical signals from X channel modulator 161 and combine with the optical signals from polarization rotator 120 to produce an output signal 124.

A power meter (PM) 122 can be operatively coupled to PBC 118 and a controller in the electrical components 190 and configured to measure optical power of the output signal 124. In some implementations, PM 122 can include a photo diode, a low-speed detector (e.g., a less than approximately 100 Megabits per second (Mbits/s) detector) and/or a high-speed detector (e.g., a greater than approximately 100 Mbits/s detector). In some implementations, each tributary channel 141-144 can be coupled to a power meter from a set of power meters and each power meter is configured to measure the optical power of the optical signal from the associated tributary channel.

The number and arrangement of devices shown in FIGS. 1A-1B are provided as an example. In some embodiments, there may be additional devices, fewer devices, different devices, or differently arranged devices than those shown in FIGS. 1A-1B. Furthermore, two or more devices shown in FIGS. 1A-1B may be implemented within a single device, or a single device shown in FIGS. 1A-1B may be implemented as multiple, distributed devices.

In use, the total output power of the output signal 124 from the optical transponder 110 can be expressed as following $$P_{out} = \sum_i P^i_{steady} \cos^2\left(\frac{\pi}{2} \frac{V^i_{swing}}{V^i_\pi} + \frac{\pi}{2} \frac{V^i_{bias}}{V^i_{optimal}}\right), \quad (1)$$

$i \in \{XI, XQ, YI, YQ\}$

Here, $P_{out}$ is the total output power from the optical transponder, which can be monitored by the power meter 122. $P_{steady}$ is the steady-state power without any modulation. $V_{swing}$ is the voltage applied to a particular MZM tributary to create a phase shift. $V_\pi$ is the peak-peak voltage swing required to achieve 180 degree phase shift. $V_{bias}$ is the bias voltage applied to a particular MZM tributary. $V_{optimal}$ is the optimal bias voltage required for null point (minimum output power). $\cos^2(\ )$ is the transfer function of MZM 140. In some instances, the quadrature bias of the optical transponder 110 can be close to 90 degrees and the extinct ratio of the polarization beam combiner (PBC) 118 can be greater than a predefined value. Thus, in such instances, the beating term between two tributaries can be negligible. The PM 122 can monitor the total output power $P_{out}$ of the output signal 124 and send a signal to the controller 192 for further processing.

Thus, $V_{swing}$ applied to MZM can be expressed as:

$$V_{swing} = N_{sig} \sin(\omega t) * V_{DAC}(\omega) * IL_{trace}(\omega) * \text{Gain}_{amp}(\omega) / 2^{(Bit_{DAC}-1)} \quad (2)$$

Here $N_{sig}$ is the amplitude of the stimulus signal, and $\omega$ is the frequency of the stimulus signal. $Bit_{DAC}$ is the number of bits for a high speed DAC 191. $V_{DAC}$ is the maximum output voltage for the high speed DAC 191. Note that $N_{sig} \in [0, 2^{(Bit_{DAC}-1)}]$. In some instances, the output from the DAC 191 can be sent through the pluggable connector (if applicable), the RF trace and the RF amplifier 116 before being received by the MZM 140. $IL_{trace}$ is the insertion loss of the RF traces from the DAC 191 output to MZM 140 input; and $\text{Gain}_{amp}$ is the gain of RF amplifier 116. $V_{DAC}$, $IL_{trace}$, and $\text{Gain}_{amp}$ can be frequency-dependent and can contribute to the bandwidth limitation of the optical transponder 110.

Upon defining the normalized signal amplitude x, the bandwidth factor $\alpha$, and the bias factor $\beta$, the total output power can be expressed as:

$$x = N_{sig}/2^{(Bit_{DAC}-1)}$$

$$\alpha_\omega \equiv \alpha(\omega) = V_{DAC}(\omega) * IL_{trace}(\omega) * \text{Gain}_{amp}(\omega)/V_\pi$$

$$\beta = V_{bias}/V_{optimal}$$

$$P_{out}(\omega, x) = P_{steady} \cos^2[0.5\pi\alpha_\omega x \sin(\omega t) + 0.5\pi\beta] \quad (3)$$

In some instances, the bandwidth factor $\alpha$ can be dependent on the frequency $\omega$, and can capture frequency responses from different components within the optical transponder 110. By measuring how the bandwidth factor $\alpha$ changes over the frequency $\omega$, the bandwidth limitation can be measured and compensated accordingly.

The total output power Eq. (3) includes the MZM transfer function ($\cos^2$ term), which is one of the contributing factors to the modulation nonlinearity. The nonlinear amplitude response, another contributing factor to the modulation nonlinearity, can be treated as a quadrature term in the normalized signal amplitude x. Thus, the total output can be expressed as:

$$P_{out}(\omega, x) = P_{steady} \cos^2[0.5\pi\alpha_\omega(\gamma_\omega x^2 + x)\sin(\omega t) + 0.5\pi\beta] \quad (4)$$

Here, $\gamma$ is the coefficient for the nonlinear amplitude response. In some instances, the coefficient $\gamma$ can be dependent on the frequency $\omega$ of the stimulus signal.

Using the Jacobi-Anger expansion, the total output power in Eq. (4) can be expressed as:

$$P_{out}(\omega, x) = 0.5 P_{steady} + 0.5 P_{steady} \cos(\pi\beta) J_0[\pi\alpha_\omega(\gamma_\omega x^2 + x)] + \\ P_{steady} \cos(\pi\beta) \sum_{m=1}^{\infty} J_{2m}[\pi\alpha_\omega(\gamma_\omega x^2 + x)] \cos(2m\omega t) - \\ P_{steady} \sin(\pi\beta) \sum_{m=1}^{\infty} J_{2m-1}[\pi\alpha_\omega(\gamma_\omega x^2 + x)] \sin((2m-1)\omega t) \quad (5)$$

Here, $J_m(\ )$ is the m-th Bessel function of the first kind. The average total output power over time $\overline{P}_{out}(\omega,x)$ can be expressed as:

$$\overline{P}_{out}(\omega,x) = 0.5 P_{steady} + 0.5 P_{steady} \cos(\pi\beta) J_0(\pi\alpha_\omega(\gamma_\omega x^2 + x)) \quad (6)$$

The processor 193 can send a signal to the tributary channel to adjust the amplitude of the stimulus signal, for example, between 0 and $2^{(Bit_{DAC}-1)}$ and receive a signal from the PM 122 including the measured average total output power $\overline{P}_{out}(\omega, x)$. Based on the curve of $\overline{P}_{out}(\omega, x)$ versus normalized signal amplitude x ($x \in [0,1]$), the processor can determine the underlying fitting parameters like [$\alpha_\omega$, $\gamma_\omega$, $P_{steady}$, $\beta$] using a curve fitting method (e.g., sequential quadratic programming (SQP)) and by minimizing the root-mean-square error as following:

$$Err_{rms} = \frac{1}{K} \sum_{k=1}^{K} \left[\overline{P}_{out}^{Meas}(\omega, x_k) - \overline{P}_{out}^{Fit}(\omega, x_k)\right]^2 / \left[\overline{P}_{out}^{Meas}(\omega, x_k)\right]^2 \quad (7)$$

Here, the superscript Meas indicates the measurement result, the superscript Fit indicates the fitting result using Eq. (6), K is the total measurement points, and k is the index of measurement point. The underlying fitting parameter like [$\alpha_\omega$, $\gamma_\omega$, $P_{steady}$, $\beta$] corresponds to a bandwidth limitation parameter, a modulation nonlinear parameter, a power imbalance parameter, and a bias parameter, respectively. The bandwidth limitation parameter $\alpha_\omega$ and the modulation nonlinear parameter $\gamma_\omega$ represent bandwidth limitation effect and the modulation nonlinear effect from individual tributary channel of the optical transponder 110. The power imbalance parameter $P_{steady}$ and a bias parameter $\beta$ represent power imbalance effect and the bias effect, respectively, between tributary channels of the optical transponder 110.

Specifically, the controller 192 or the DSP can switch the communication path to a stimulus signal channel, during a calibration phase/mode (e.g., initial power-up with no live traffic, module reconfiguration, module switching to a new channel, wavelength adjustment, maintenance window, and/or the like) of the optical transponder 110. The controller 192 or the DSP can send the stimulus signal to a tributary channel from a set of tributary channels 141-144. The controller 192 (or the DSP) can select a tributary channel and send the stimulus signal to that tributary channel. The other tributary channels from the set of tributary channels 141-144 do not receive an input signal or receive a signal with a zero amplitude value. The controller 192 (or the DSP) can select a frequency of the stimulus signal to be a first frequency value from a set of frequency values. In some instances, the controller 192 (or the DSP) can select a frequency value (e.g., 3.77 GHz) at a lower end of the range of the set of frequency values as the initial frequency value.

In some instances, the DAC 191 can switch receiving signals from the controller 192 or the other components of the DSP (e.g., the FEC encoder 197, the first filter 196, the second filter 195.) For example, during a calibration phase/mode (e.g., initial power-up with no live traffic, module reconfiguration, module switching to a new channel, wavelength adjustment, maintenance window, and/or the like) of the optical transponder 110, the DAC 191 can receive a stimulus signal from the controller 192 (the processor 193 or the memory 194). In some instances, during the calibration phase/mode, the DAC 191 does not receive data signals from the other components of the DSP (e.g., the FEC encoder 197, the first filter 196, the second filter 195.) During a signal transmission phase (e.g., with live data traffic) of the optical transponder 110, the DAC 191 can receive data signals from the other components of the DSP (e.g., the FEC encoder 197, the first filter 196, the second filter 195) and not receive the stimulus signal from the controller 192. In some instances, the DAC 191 can receive the data signals from the other components of the DSP (e.g., the FEC encoder 197, the first filter 196, the second filter 195), while receiving the stimulus signal from the controller 192.

In some instances, the memory 194 (e.g., a random-access memory (RAM) on a DSP chip) can store a stimulus signal (e.g., a sinusoidal stimulus signal) and the DAC 191 can "play back" from the memory 194 during the calibration phase of the optical transponder 110. In other instances, the processor 193 can send the stimulus signal to the DAC 191. During the calibration phase of the optical transponder 110, in some instances, the DAC 191 does not receive live data signals from the other components of the DSP. The DAC 191 can send the stimulus signal to a tributary channel from a set of tributary channels 141-144 of the optical transponder 110 and, in some instances, send a signal with a zero input to the other tributary channels of the set of tributary channels 141-144. The output power from the other tributary channels is close to zero in response to the signal with the zero input. The total output power measured by the PM 122 is in response to the tributary channel receiving the stimulus signal (e.g., a sinusoidal stimulus signal).

The controller 192 (or the DSP) can send a signal to one tributary channel from a set of tributary channels 141-144 to adjust (or sweep, or scan) the amplitude of the stimulus signal between a first amplitude value (e.g., $N_{sig}$ is close 32 a.u.) from a set of amplitude values and a second amplitude value ($N_{sig}$ is close 127 a.u.) from the set of amplitude values. The controller can receive a signal from the PM 122 including the measured average total output power $\overline{P}_{out}(\omega, x)$ (or a first set of output optical power values) of the output signal 124 from the tributary channel. Further, the controller can send a zero input signal to the other tributary channels and thus the controller can receive a zero output power from these tributary channels. For the tributary channel, the controller 192 (or the DSP) can then determine, based on the Eq. (6) and the set of output optical power values in response to the amplitude of the stimulus signal being adjusted between the first amplitude value and the second amplitude value, the underlying fitting parameters like [$\alpha_\omega$, $\gamma_\omega$, $P_{steady}$, $\beta$]. The controller 192 (or the DSP) can use the average total output power in Eq. (6) and a curve fitting method (e.g., sequential quadratic programming (SQP)) to determine a value for each underlying fitting parameter by minimizing the root-mean-square error in Eq. (7). The underlying fitting parameters include the bandwidth limitation parameter $\alpha_\omega$, the modulation nonlinear parameter $\gamma_\omega$, the power imbalance parameter $P_{steady}$, and the bias parameter $\beta$.

The controller 192 (or the DSP) can then select a second frequency value from the set of frequency values (e.g., 3.77 GHz, 7.54 GHz, 11.3 GHz. 15.1 GHz, 18.8 GHz, 22.6 GHz, 26.4 GHz) as the frequency of the stimulus signal. The controller 192 (or the DSP) can then adjust the amplitude of the stimulus signal between the first amplitude value and the second amplitude value from the set of amplitude values and receive a second set of output optical power values in response to the amplitude of the stimulus signal being adjusted. The controller 192 (or the DSP) determines a value for each underlying fitting parameter for each selected frequency value. In some instances, the controller 192 (or the DSP) can determine the bandwidth limitation parameter $\alpha_\omega$ and the modulation nonlinear parameter $\gamma_\omega$ for each selected frequency value (e.g., 3.77 GHz, 7.54 GHz, 11.3 GHz. 15.1 GHz, 18.8 GHz, 22.6 GHz, 26.4 GHz) while using the previously-determined power imbalance parameter and the bias parameter [$P_{steady}$, $\beta$] at lower frequency value (e.g., 3.77 GHz).

The controller 192 (of the DSP) can determine the bandwidth limitation based on the determined values of the bandwidth limitation parameter $\alpha_\omega$ for each selected frequency value. The bandwidth of the optical transponder can be defined as the attenuation between the total output power at a particular frequency of the stimulus signal and the total output power at a lower frequency (e.g., 3.77 GHz) (as described in further details with regards to FIG. 6.) Within each tributary, a bandwidth limitation may result from various components within the optical transponder 110, including, for example, the digital-to-analog converter (DAC) 191, the radio frequency (RF) traces in the print circuit board (PCB) (not shown), the pluggable interface (if applicable) (not shown), the RF electrical amplifier 116, and/or the optical modulator 140.

The controller 192 (or the DSP) determines a set of coefficients (e.g., $\alpha_0$, $\alpha_1$, $\alpha_2$) for the first filter 196 (e.g., FIR filter) based on the bandwidth limitation and the set of determined values of the bandwidth limitation parameter $\alpha_\omega$. In response, the controller (or the DSP) sends a first signal to the first filter to set (or update) the set of coefficients for the first filter 196 such that the bandwidth limitation of the optical transponder 110 can be compensated. Details of the first filter 196 are described herein with regards to FIG. 7A.

The controller 192 (or the DSP) can determine the modulation nonlinearity (the nonlinear amplitude response component of the modulation nonlinearity effect) based on the determined value of the modulation nonlinear parameter $\gamma_\omega$ for each selected frequency value. The modulation nonlinearity may result from a transfer function of the optical modulator 144 and/or a nonlinear amplitude response from the various components within the optical transponder 110, including, for example, the digital-to-analog converter (DAC) 191, the radio frequency (RF) traces in the print circuit board (PCB) (not shown), the pluggable interface (if applicable) (not shown), the RF electrical amplifier 116, and/or the optical modulator 140.

The controller 192 (or the DSP) determines a set of coefficients (e.g., y, $y^2$, $y^3$) for the second filter 195 (e.g., a Volterra filter) based on the modulation nonlinearity and set of determined values of modulation nonlinear parameter $\gamma_\omega$. In response, the controller 192 (or the DSP) sends a second signal to the second filter 195 (e.g., the Volterra filter) to set (or update) the set of coefficients for the second filter 195 such that the nonlinear amplitude response of the modulation nonlinearity can be compensated. In some implementations, the second filter 195 include an 'arc sin' function (also referred to as "a third filter") implemented, for example, in a look-up table in the DSP ASIC. The 'aresin' function (or the third filter) can compensate the transfer function of the MZM 140, thus reducing the modulation nonlinearity. In some instances, the measured and calculated values including the bandwidth limitation, nonlinear amplitude response, and the set of underlying fitting parameters, [$\alpha_\omega$, $\gamma_\omega$, $P_{steady}$, $\beta$], can be stored in the memory (such as the memory 194 in FIG. 1A; or an Electrically Erasable Programmable Read-Only Memory (EEPROM)) and used to set or update the filter values in the DSP ASIC. The details of the second filter 195 are described herein with regards to FIG. 7B. In other words, the controller 192 (or the DSP) determines the bandwidth limitation independent from an impact of the modulation nonlinearity of the optical transponder 110 and determines the effect of the nonlinear amplitude response independent from the effect of the transfer function of the MZM 140.

The controller 192 (or the DSP) can perform the measurements for each tributary channel 141-144 to determine the bandwidth limitation and the modulation nonlinearity for each tributary channel and update the first filter coefficients and the second filter coefficients for each tributary channel. In some implementations, a single power meter 122 is coupled to the set of the tributary channels 141-144 and thus the controller 192 (or the DSP) sends the stimulus signal to a single tributary channel at a time (or in serial) and measures the output optical power of the optical signal 124 from that tributary channel. In other implementations, each tributary channel from the set of tributary channels 141-144 can be coupled to a power meter from a set of power meters (not shown) and the controller 192 (or the DSP) sends the stimulus signal to the set of tributary channels in parallel. Each PM from the set of PMs (not shown) measures the output optical power from the tributary channel coupled to that PM and the measurements can be performed in parallel.

Upon performing measurements for each tributary channel, the controller 192 (or the DSP) can switch the data path to live traffic data path such that the Tx optical module 113 receives data signals from the DSP, and does not receive the stimulus signal (i.e., signal transmission phase). The data signals are compensated using the first filter 196 and the second filter 195 before being sent to the Tx optical module 113. In some instances, during the calibration phase/mode, the RF amplifier 116 of the Tx optical module 113 can be placed in a manual gain control (MGC) mode. During the signal transmission phase, the RF amplifier 116 can switch to an automatic gain control (AGC) mode to compensate signal draft due to, for example, environmental changes.

FIGS. 2A-2D show an example of the total output power of an output signal from each tributary channel of an optical transponder, respectively, as a function of an amplitude of a stimulus signal, according to an embodiment. The frequency of the stimulus signal can be defined to be close to 3.77 GHz. A controller (such as the controller 192 in FIG. 1A) can send a signal to one tributary channel from a set of tributary channels (such as the tributary channels 141-144 in FIG. 1B) of the optical transponder (such as the optical transponder 110 in FIGS. 1A-1B) to adjust the amplitude of the stimulus signal. The controller can receive a signal from a power meter (such as the power meter (PM) 122 in FIG. 1B) indicating the measured average total output power $\overline{P}_{out}(\omega, x)$ of the output signal (e.g., the output signal 124 shown in FIG. 1B) from the tributary channel. Further, the controller can send a zero input signal to the other tributary channels and thus the controller can receive a zero output power from these tributary channels. For the one tributary channel, the controller can then determine, based on the Eq. (6), the underlying fitting parameters like [$\alpha_\omega$, $\gamma_\omega$, $P_{steady}$, $\beta$] using a curve fitting method (e.g., sequential quadratic programming (SQP)) and by minimizing the root-mean-square error in Eq. (7).

Specifically, FIG. 2A shows measured 203 and curve-fitted 204 total output power 202 of the output signal from the XI tributary channel of the optical transponder as a function of the amplitude of the stimulus signal 201. The controller can determine the underlying fitting parameters [$\alpha_\omega$, $\gamma_\omega$, $P_{steady}$, $\beta$] 206 based on the average total output power $\overline{P}_{out}(\omega, x)$ in Eq. (6) and the root-mean-square error minimization in Eq. (7). The theoretical curve of the total output power 204 as a function of the amplitude of the stimulus signal 201 fits the measured values 203, showing that the average total output power over time $\overline{P}_{out}(\omega, x)$ in Eq. (6) captures the bandwidth limitation effects and the modulation nonlinearity of the optical transponder. Among the underlying fitting parameters 206, the controller can determine the bandwidth limitation parameter $\alpha_\omega$ for the XI tributary channel to be close to 1.73959, the modulation nonlinear parameter $\gamma_\omega$ for the XI tributary channel to be close to −0.45028, the power imbalance parameter $P_{steady}$ for the XI tributary channel to be close to 0.271222, and the bias parameter $\beta$ for the XI tributary channel to be close to 1.

FIG. 2B shows measured 213 and curve-fitted 214 total output power 212 of the output signal from the XQ tributary channel of the optical transponder as a function of the amplitude of the stimulus signal 211. Among the underlying fitting parameters 216, the controller can determine the bandwidth limitation parameter $\alpha_\omega$ for the XQ tributary channel to be close to 1.704235, the modulation nonlinear parameter $\gamma_\omega$ for the XQ tributary channel to be close to −0.44211, the power imbalance parameter $P_{steady}$ for the XQ tributary channel to be close to 0.24233, and the bias parameter $\beta$ for the XQ tributary channel to be close to 1. The theoretical curve of the total output power 214 as a function of the amplitude of the stimulus signal 211 fits the measured values 213, showing that the average total output power over time $\overline{P}_{out}(\omega, x)$ in Eq. (6) captures the bandwidth limitation effects and the modulation nonlinearity of the optical transponder.

FIG. 2C shows measured 223 and curve-fitted 224 total output power 222 of the output signal from the YI tributary channel of the optical transponder as a function of the amplitude of the stimulus signal 221. Among the underlying fitting parameters 226, the controller can determine the bandwidth limitation parameter $\alpha_\omega$ for the YI tributary channel to be close to 1.699169, the modulation nonlinear parameter $\gamma_\omega$ for the YI tributary channel to be close to −0.44296, the power imbalance parameter $P_{steady}$ for the YI tributary channel to be close to 0.289105, and the bias parameter $\beta$ for the YI tributary channel to be close to 1. The theoretical curve of the total output power 224 as a function of the amplitude of the stimulus signal 221 fits the measured values 223, showing that the average total output power over time $\overline{P}_{out}(\omega, x)$ in Eq. (6) captures the bandwidth limitation effects and the modulation nonlinearity of the optical transponder.

FIG. 2D shows measured 233 and curve-fitted 234 total output power 232 of the output signal from the YQ tributary channel of the optical transponder as a function of the amplitude of the stimulus signal 231. Among the underlying fitting parameters 236, the controller can determine the bandwidth limitation parameter $\alpha_\omega$ for the YQ tributary channel to be close to 1.780279, the modulation nonlinear parameter $\gamma_\omega$ for the YQ tributary channel to be close to −0.4542, the power imbalance parameter $P_{steady}$ for the YQ tributary channel to be close to 0.261264, and the bias parameter $\beta$ for the YQ tributary channel to be close to 1. The theoretical curve of the total output power 234 as a function of the amplitude of the stimulus signal 231 fits the measured values 233, showing that the average total output power over time $\overline{P}_{out}(\omega, x)$ in Eq. (6) captures the bandwidth limitation effects and the modulation nonlinearity of the optical transponder.

FIGS. 3A-3H show an example of the total output power of an output signal for a tributary channel of an optical transponder as a function of an amplitude of a stimulus signal for different frequencies of the stimulus signal, according to an embodiment. A controller (such as the controller 192 in FIG. 1A) can first select a first frequency value from a set of frequency values of the stimulus signal. The controller can then send a signal to one tributary channel from a set of tributary channels (such as the tributary channels 141-144 in FIG. 1B) of the optical transponder (such as the optical transponder 110 in FIGS. 1A-1B) to adjust the amplitude of the stimulus signal and keep the frequency of the stimulus signal at the first frequency value. The controller can receive a signal from a power meter (such as the power meter (PM) 122 in FIG. 1B) indicating the measured average total output power $\overline{P}_{out}(\omega, x)$ of the output signal (e.g., the output signal 124 shown in FIG. 1B) from the tributary channel. Further, the controller can send a zero input signal to the other tributary channels and thus the controller can receive a zero output power from these tributary channels. For the one tributary channel, the controller can then determine, based on the Eq. (6), the underlying fitting parameters [$\alpha_\omega$, $\gamma_\omega$, $P_{steady}$, $\beta$] using a curve fitting method (e.g., sequential quadratic programming (SQP)) and by minimizing the root-mean-square error in Eq. (7). The controller can then select a second frequency value from the set of frequency values of the stimulus signal and repeat the steps of adjusting the amplitude of the stimulus signal, receiving measured total output power values, and determining the underlying fitting parameters. In some instances, the controller can determine a set of underlying fitting parameters [$\alpha_\omega$, $\gamma_\omega$, $P_{steady}$, $\beta$] for each selected frequency value (e.g., 3.77 GHz, 7.54 GHz, 11.3 GHz. 15.1 GHz, 18.8 GHz, 22.6 GHz, 26.4 GHz) from the set of frequency values. In other instances, the controller can determine the underlying fitting parameters of the power imbalance parameter and the bias parameter [$P_{steady}$, $\beta$] when the frequency value is less (e.g., 3.77 GHz). The controller can determine the bandwidth limitation parameter $\alpha_\omega$ and the modulation nonlinear parameter $\gamma_\omega$ for each selected frequency value (e.g., 3.77 GHz, 7.54 GHz, 11.3 GHz. 15.1 GHz, 18.8 GHz, 22.6 GHz, 26.4 GHz) while using the previously-determined power imbalance parameter and the bias parameter [$P_{steady}$, $\beta$] at lower frequency value (e.g., 3.77 GHz).

Figure 3B:
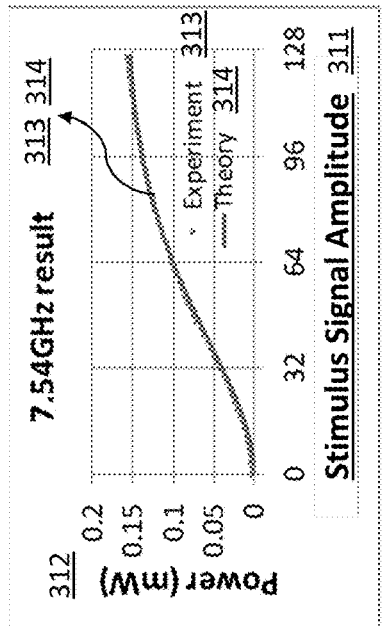
FIGS. 3A-3H show an example of the total output power of an output signal for a tributary channel of an optical transponder as a function of an amplitude of a stimulus signal for different frequencies of the stimulus signal, according to an embodiment.
Figure 3D:
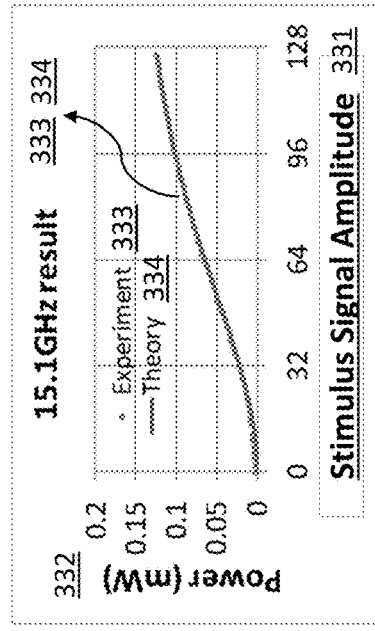
Figure 3A:
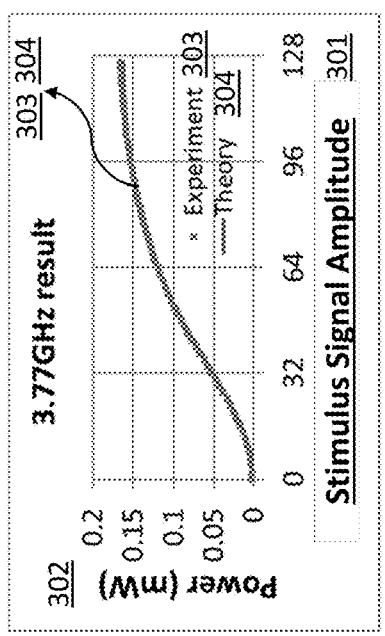
Figure 3C:
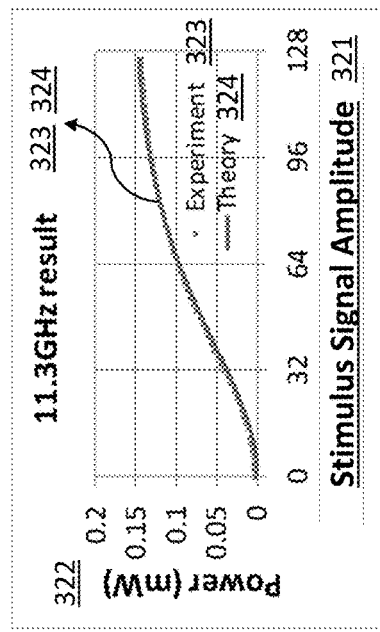
Figure 3E:
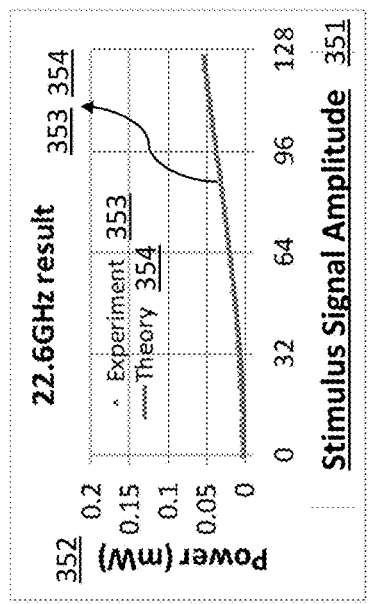
Figure 3F:
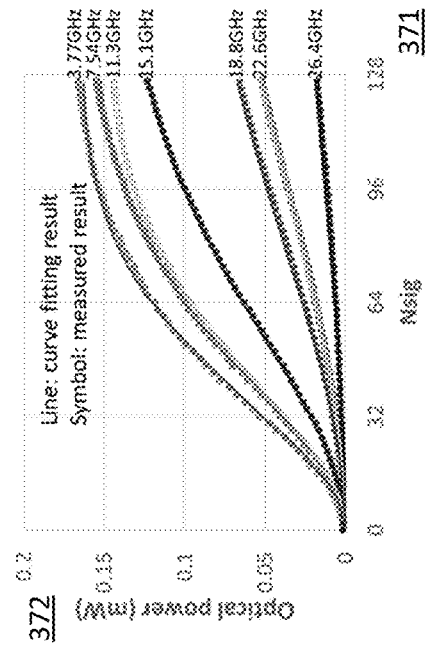
Figure 3G:
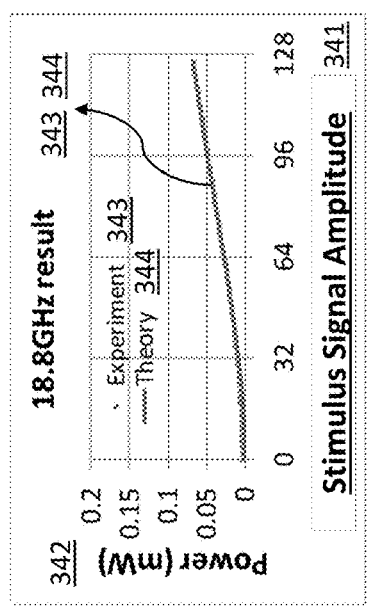
Figure 3H:
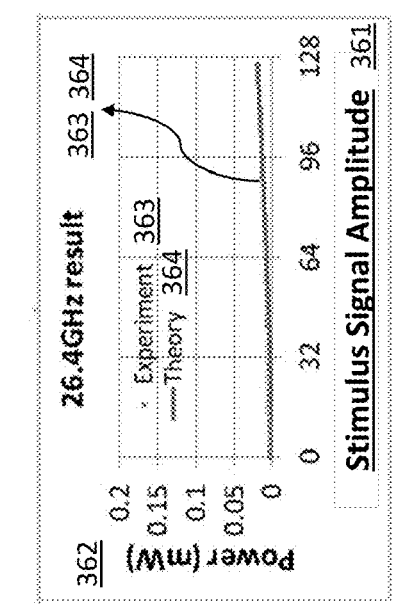

FIG. 3A shows, at a frequency of the stimulus signal of 3.77 GHz, the measured 303 and the curve-fitted 304 total output power 302 of the output signal from the XI tributary channel as a function of the amplitude of the stimulus signal 301. FIG. 3B shows, at a frequency of the stimulus signal of 7.54 GHz, the measured 313 and the curve-fitted 314 total output power 312 of the output signal from the XI tributary channel as a function of the amplitude of the stimulus signal 311. FIG. 3C shows, at a frequency of the stimulus signal of 11.3 GHz, the measured 323 and the curve-fitted 324 total output power 322 of the output signal from the XI tributary channel as a function of the amplitude of the stimulus signal 321. FIG. 3D shows, at a frequency of the stimulus signal of 15.1 GHz, the measured 333 and the curve-fitted 334 total output power 332 of the output signal from the XI tributary channel as a function of the amplitude of the stimulus signal 331. FIG. 3E shows, at a frequency of the stimulus signal of 18.8 GHz, the measured 343 and the curve-fitted 344 total output power 342 of the output signal from the XI tributary channel as a function of the amplitude of the stimulus signal 341. FIG. 3F shows, at a frequency of the stimulus signal of 22.6 GHz, the measured 353 and the curve-fitted 354 total output power 352 of the output signal from the XI tributary channel as a function of the amplitude of the stimulus signal 351. FIG. 3G shows, at a frequency of the stimulus signal of 26.4 GHz, the measured 363 and the curve-fitted 364 total output power 362 of the output signal from the XI tributary channel as a function of the amplitude of the stimulus signal 361. The theoretical curves of the total output power (304, 314, 324, 334, 344, 354, and 364) as a function of the amplitude of the stimulus signal (301, 311, 321, 331, 341, 351, and 361) fits the measured values (303, 313, 323, 333, 343, 353, and 363), showing that the average total output power over time $\overline{P}_{out}(\omega, x)$ in Eq. (6) captures the bandwidth limitation effects and the modulation nonlinearity of the optical transponder. FIG. 3H includes FIGS. 3A-3G for a comparison of the total output power 372 as a function of the amplitude of stimulus signal 371 for different frequencies (3.77 GHz, 7.54 GHz, 11.3 GHz. 15.1 GHz, 18.8 GHz, 22.6 GHz, 26.4 GHz.)

Figure 4:
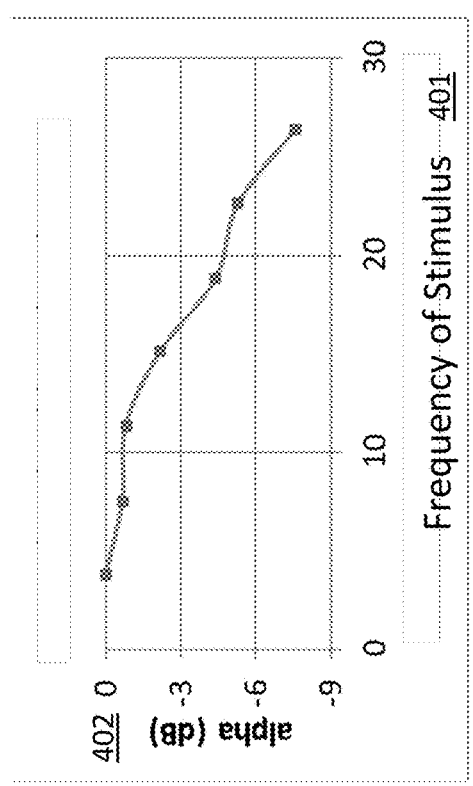
FIG. 4 shows an example graph of the bandwidth limitation parameter $\alpha_\omega$ as a function of the frequency of the stimulus signal, according to an embodiment.

FIG. 4 shows an example graph of the bandwidth limitation parameter $\alpha_\omega$ as a function of the frequency of the stimulus signal, according to an embodiment. The controller can determine, based on the fitted results from FIGS. 3A-3G, the bandwidth limitation parameter $\alpha_\omega$ 402 for each selected frequency value (e.g., 3.77 GHz, 7.54 GHz, 11.3 GHz. 15.1 GHz, 18.8 GHz, 22.6 GHz, 26.4 GHz). The bandwidth limitation parameter $\alpha_\omega$ 402 decreases as the frequency of the stimulus signal 401 increases. In some instances, the bandwidth limitation parameter $\alpha_\omega$ 402 for the selected frequency value (e.g., 7.54 GHz, 11.3 GHz. 15.1 GHz, 18.8 GHz, 22.6 GHz, 26.4 GHz) can be normalized based on the bandwidth limitation parameter $\alpha_\omega$ at a frequency of 3.77 GHz.

Figure 5:
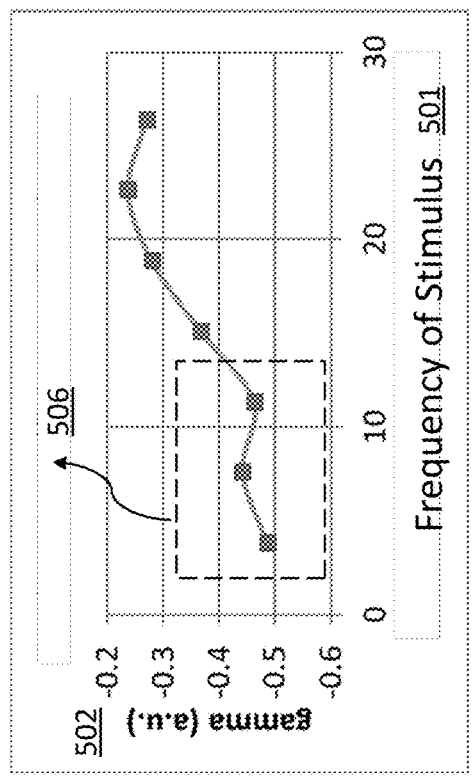
FIG. 5 shows an example graph of the modulation nonlinear parameter $\gamma_\omega$ as a function of the frequency of the stimulus signal, according to an embodiment.

FIG. 5 shows an example graph of the modulation nonlinear parameter $\gamma_\omega$ as a function of the frequency of the stimulus signal, according to an embodiment. The controller can determine, based on the fitted results from FIGS. 3A-3G, the modulation nonlinear parameter $\gamma_\omega$ 502 for each selected frequency value (e.g., 3.77 GHz, 7.54 GHz, 11.3 GHz. 15.1 GHz, 18.8 GHz, 22.6 GHz, 26.4 GHz). The modulation nonlinear parameter $\gamma_\omega$ 502 increases as the frequency of the stimulus signal 501 increases. In some instances, within a range of the Nyquist frequency (e.g., 0 to 15.1 GHz), the change of modulation nonlinear parameter $\gamma_\omega$ 506 can be relatively small.

Figure 6:
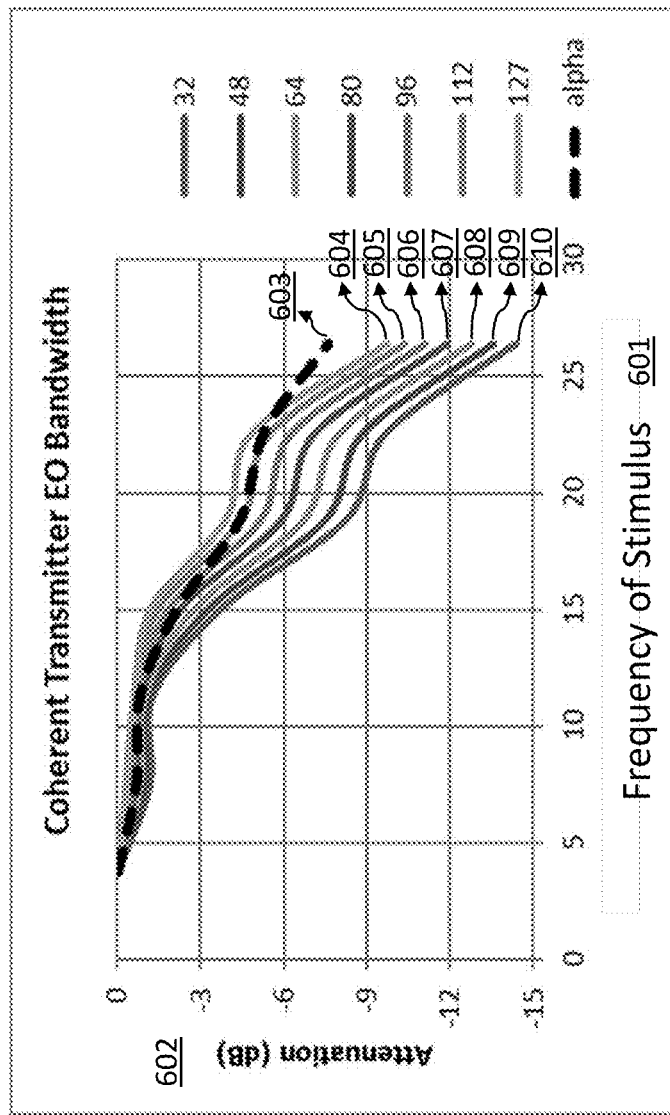
FIG. 6 shows an example graph comparing the bandwidth of the optical transponder measured by different methods, according to an embodiment.

FIG. 6 shows an example graph comparing the bandwidth of the optical transponder measured by different methods, according to an embodiment. The bandwidth of the optical transponder can be defined as the attenuation 602 between the total output power at a particular frequency of the stimulus signal and the total output power at a lower frequency (e.g., 3.77 GHz). Curve 603 shows the curve of the attenuation 602 as a function of the frequency of the stimulus signal 601 when the bandwidth limitation parameter $\alpha_\omega$ is determined as described herein (i.e., two dimensional scan of the amplitude of the stimulus signal and the frequency of the stimulus signal.) Curve 604 shows the curve of the attenuation 602 as a function of the frequency of the stimulus signal 601 when the bandwidth limitation parameter $\alpha_\omega$ is determined as the amplitude of the stimulus signal ($N_{sig}$) is predetermined ($N_{sig}$ is close 127 a.u.) and the frequency of the stimulus signal is scanned. Curve 605 shows the curve of the attenuation 602 as a function of the frequency of the stimulus signal 601 when the bandwidth limitation parameter $\alpha_\omega$ is determined as the amplitude of the stimulus signal ($N_{sig}$) is predetermined ($N_{sig}$ is close 112 a.u.) and the frequency of the stimulus signal is scanned. Curve 606 shows the curve of the attenuation 602 as a function of the frequency of the stimulus signal 601 when the bandwidth limitation parameter $\alpha_\omega$ is determined as the amplitude of the stimulus signal ($N_{sig}$) is predetermined ($N_{sig}$ is close 96 a.u.) and the frequency of the stimulus signal is scanned. Curve 607 shows the curve of the attenuation 602 as a function of the frequency of the stimulus signal 601 when the bandwidth limitation parameter $\alpha_\omega$ is determined as the amplitude of the stimulus signal ($N_{sig}$) is predetermined ($N_{sig}$ is close 80 a.u.) and the frequency of the stimulus signal is scanned. Curve 608 shows the curve of the attenuation 602 as a function of the frequency of the stimulus signal 601 when the bandwidth limitation parameter $\alpha_\omega$ is determined as the amplitude of the stimulus signal ($N_{sig}$) is predetermined ($N_{sig}$ is close 64 a.u.) and the frequency of the stimulus signal is scanned. Curve 609 shows the curve of the attenuation 602 as a function of the frequency of the stimulus signal 601 when the bandwidth limitation parameter $\alpha_\omega$ is determined as the amplitude of the stimulus signal ($N_{sig}$) is predetermined ($N_{sig}$ is close 48 a.u.) and the frequency of the stimulus signal is scanned. Curve 610 shows the curve of the attenuation 602 as a function of the frequency of the stimulus signal 601 when the bandwidth limitation parameter $\alpha_\omega$ is determined as the amplitude of the stimulus signal ($N_{sig}$) is predetermined ($N_{sig}$ is close 32 a.u.) and the frequency of the stimulus signal is scanned.

As shown by the curves 604-610, the bandwidth of the optical transponder can be different for a stimulus signal with a less amplitude value ($N_{sig}=32$) and a greater amplitude value ($N_{sig}=127$). These measurements with one-dimensional scan of the frequency of the stimulus signal with the amplitude of the stimulus signal predetermined can result in a lack of consideration of the nonlinear amplitude response, which can cause the actual phase shift applied to the MZM (e.g., MZM 140 in FIG. 1B) to be less than the intended phase shift. Thus, over-compensating of the bandwidth limitation and the modulation nonlinearity can take place. In contrast, as shown by the curve 603 (with two-dimensional scan), the measurements separate the modulation nonlinearity effect from the bandwidth limitation effect. Thus, the controller can perform a more accurate measurement of the bandwidth limitation and the modulation nonlinearity. In some instances, in response to the measurements of the bandwidth limitation, the coefficients of the first filter (e.g., the FIR filter) can be determined to inversely compensate the bandwidth limitation.

Figure 7A:
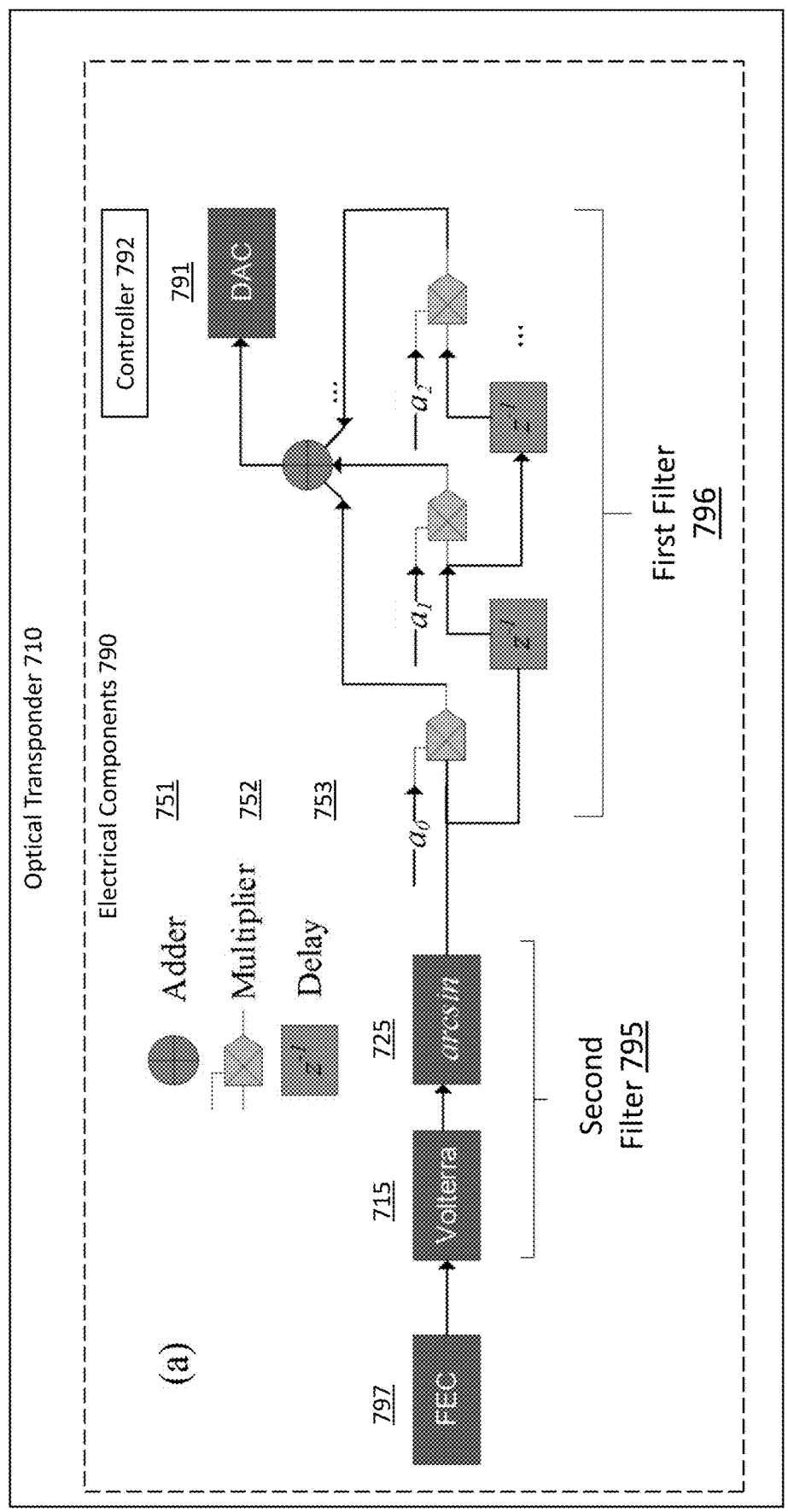
FIGS. 7A-7B are block diagrams illustrating electrical components of an optical transponder to compensate the bandwidth limitation and the modulation nonlinearity, according to an embodiment.
Figure 7B:
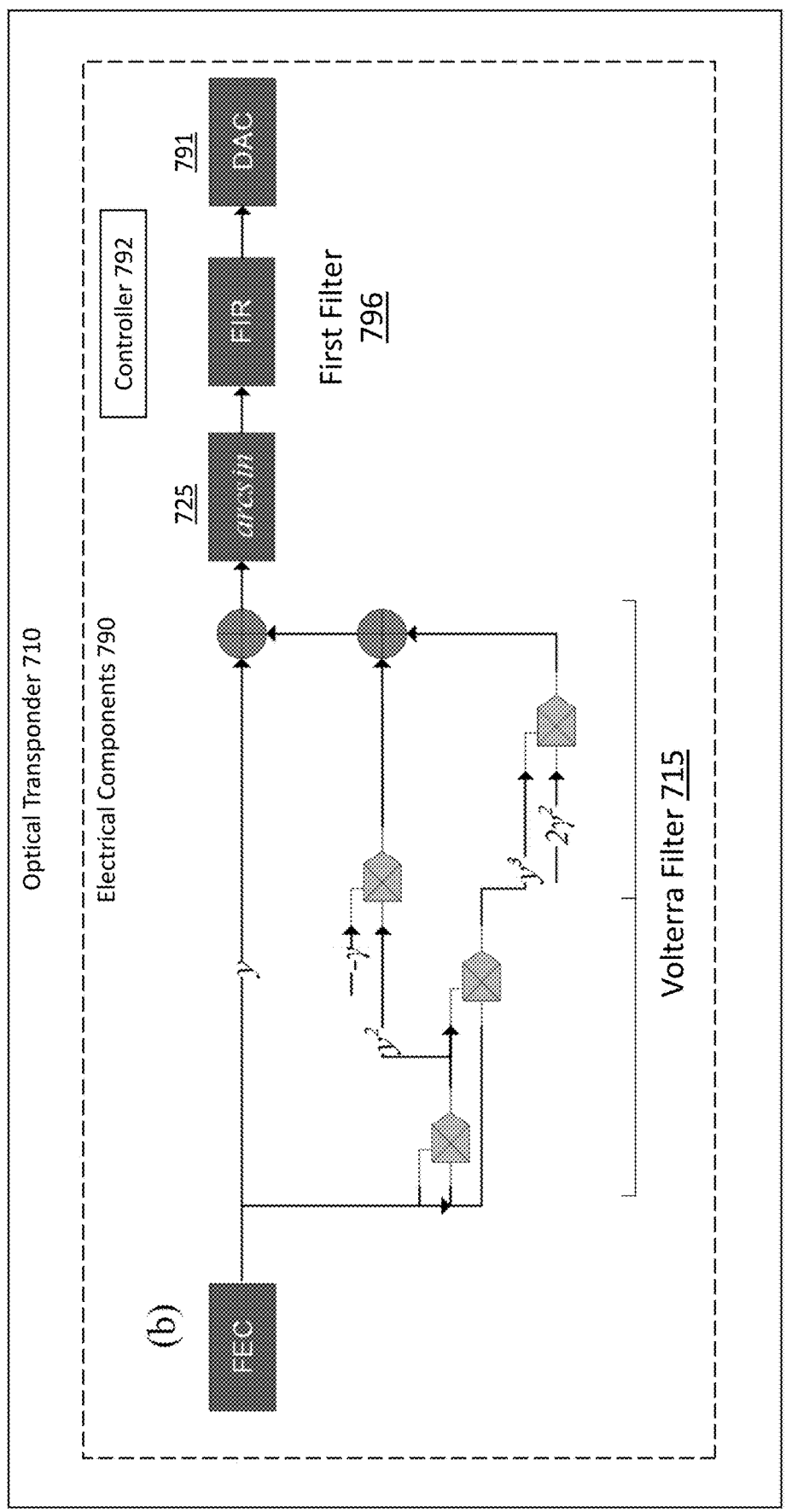

FIGS. 7A-7B are block diagrams illustrating electrical components of an optical transponder to compensate the bandwidth limitation and the modulation nonlinearity, according to an embodiment. The optical transponder 710 is structurally and functionally similar to the optical transponder 110 described with regards to FIGS. 1A-1B. The electrical components 790 are structurally and functionally similar to the electrical components 190 described with regards to FIGS. 1A-1B. In some implementations, the electrical components 790 can be included on a DSP chip (e.g., a DSP ASIC). In some implementations, the electrical components 790 can include a controller 792 (similar to the controller 192 in FIGS. 1A-1B), a DAC 791, a first filter 796, a second filter 795, and a FEC encoder 797. The first filter (e.g., a FIR filter) 796 can include a set of adders 751, a set of multipliers 752, and a set of delays 753 to compensate the bandwidth limitation of the optical transponder 710.

The coefficients of the FIR filter (e.g., $\alpha_0$, $\alpha_1$, $\alpha_2$) can be determined from the underlying fitting parameter, bandwidth limitation parameter $\alpha_\omega$.

In some implementations, the second filter 795 can be used to compensate the modulation nonlinearity of the optical transponder. The modulation nonlinearity compensation can have the constellation points in IQ complex plane linearly distributed according to the driving voltage (x). The location of the constellation point is proportional to the ratio of $P_{out}/P_{steady}$. The compensation of the modulation nonlinearity includes the compensation of the transfer function of the MZM and the compensation of the nonlinear amplitude response from various components within the optical transponder, for example, the digital-to analog converter (DAC), the radio frequency (RF) traces in the print circuit board (PCB), the pluggable interface (if applicable), the RF electrical amplifier, and/or the optical modulator. In some implementations, the compensation of the modulation nonlinearity includes applying inverse functions so that at the output the influence of nonlinearity is cancelled out.

In some instances, the second filter 795 include an 'arc sin' function 725 implemented, for example, in a look-up table in the DSP ASIC. The 'arc sin' function 725 can compensate the transfer function of the MZM, thus reducing the modulation nonlinearity. The second filter 795 can include a Volterra filter 715 used to compensate the nonlinear amplitude response. The details of the Volterra filter 715 of the second filter 795 are described in FIG. 7B.

Based on the determined underlying fitting parameter, modulation nonlinear parameter $\gamma_\omega$, the Volterra filter 715 can be used to compensate the nonlinear amplitude response effect. In some instances, within a range of the Nyquist frequency (e.g., 0 to 15.1 GHz), the change of modulation nonlinear parameter $\gamma_\omega$ can be relatively small. In some instances, in response to the bandwidth limitation being compensated, the frequency components within the Nyquist frequency can have relatively the same amplitude. Thus, the average nonlinear amplitude response can be expressed as:

$$\bar{\gamma} = \frac{1}{\omega_{NY}} \int_0^{\omega_{NY}} \gamma(\omega) d\omega \tag{8}$$

Here $\omega_{NY}$ is the Nyquist frequency. In these instances, the influence outside the Nyquist frequency, $\omega_{NT}$, are not considered because, for example, the sharp roll-off of FIR filter can eliminate those frequency components. In response to performing a Taylor expansion on a quadratic equation, the average nonlinear amplitude response can be expressed as:

$$y = \bar{\gamma} x^2 + x \tag{9}$$

$$x = \frac{\sqrt{1 + 4\bar{\gamma} y} - 1}{2\bar{\gamma}} \approx y - \bar{\gamma} y^2 + 2\bar{\gamma}^2 y^3$$

In these instances, the coefficients of Taylor expansion are the same as the coefficients for the Volterra filter. Thus, a third-order Volterra filter 715 can be implemented in the electrical components 790 (for example, a DSP ASIC) to compensate (or reverse) the nonlinear amplitude response. The coefficients of the Volterra filter (e.g., y, $y^2$, $y^3$) can be directly based on the coefficient of nonlinear amplitude response and the modulation nonlinear parameter $\gamma_\omega$ measured using the two-dimensional scan method.

Figure 8:
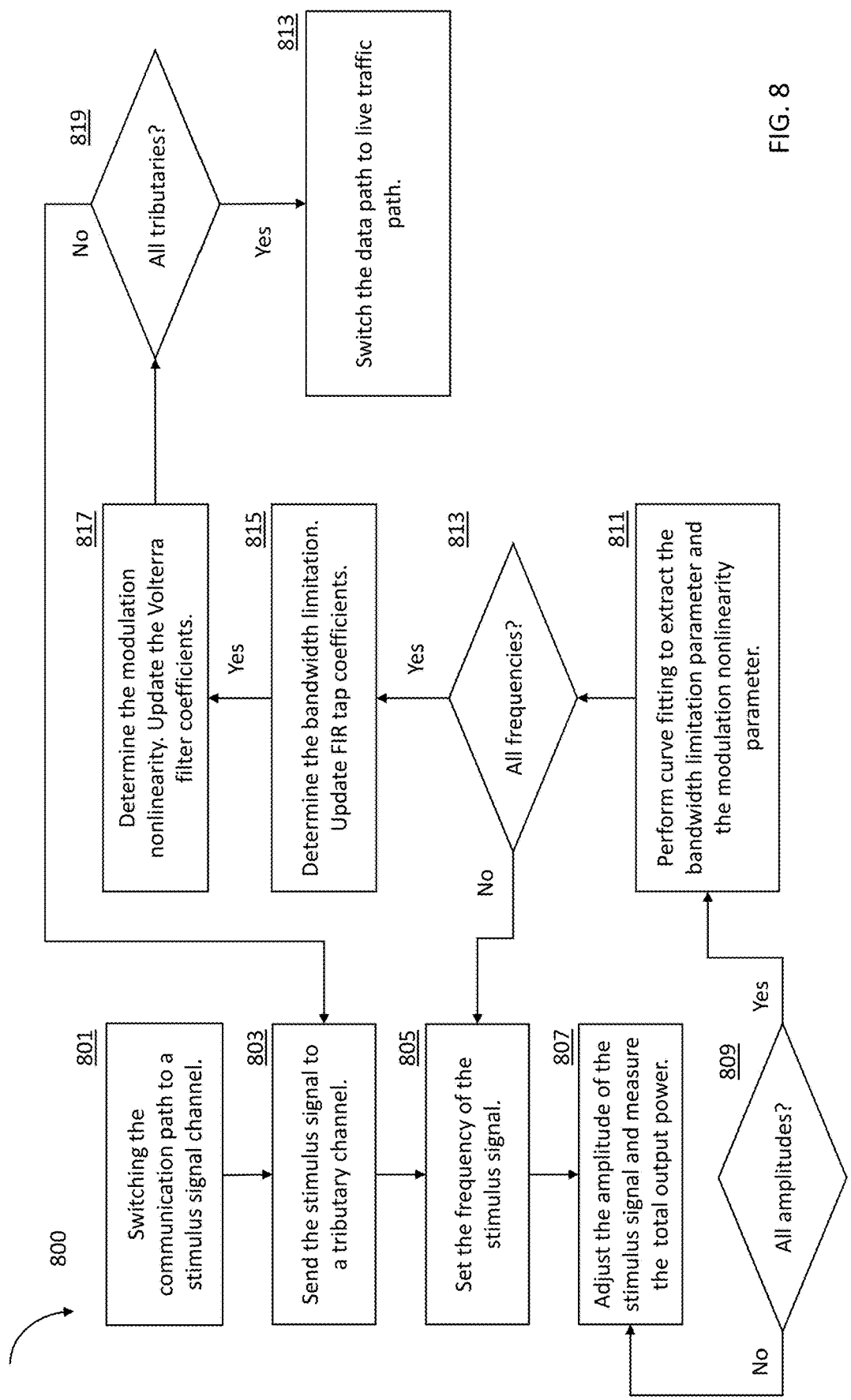
FIG. 8 is a flow chart illustrating a method for the bandwidth limitation and modulation nonlinearity compensation process, according to an embodiment.

FIG. 8 is a flow chart illustrating a method for the bandwidth limitation and modulation nonlinearity compensation process, according to an embodiment. The bandwidth limitation and modulation nonlinearity compensation process 800 can be executed at, for example, a controller such as the controller 190 shown and described with respect to FIG. 1A or a digital signal processing (DSP) chip of an optical transponder such as the optical transponder 110 shown and described with respect to FIG. 1A. At 801, the method includes switching the communication path to a stimulus signal channel, during a calibration phase/mode (e.g., initial power-up with no live traffic, module reconfiguration, module switching to a new channel, wavelength adjustment, maintenance window, and/or the like) of the optical transponder. In other words, during the calibration phase/mode, the DSP of the optical transponder does not send data signals (or live data traffic) to the Tx optical module (such as the Tx optical module 113 in FIGS. 1A-1B) of the optical transponder. Rather, the controller (a processor such as the processor 193 in FIG. 1A or a memory such as the memory 194 in FIG. 1A.), or the DSP, sends a stimulus signal (e.g., a sinusoidal signal), via a stimulus signal channel, to the Tx optical module (e.g., to an RF amplifier of the Tx optical module.) During a signal transmission phase (e.g., with live data traffic) of the optical transponder, the DSP sends data signals, and not the stimulus signal, to the Tx optical module. In some instances, during the calibration phase/mode, the RF amplifier (such as the RF amplifier 116 in FIG. 1B) of the Tx optical module can be placed in a manual gain control (MGC) mode. During the signal transmission phase, the RF amplifier can switch to an automatic gain control (AGC) mode to compensate signal draft due to, for example, environmental changes.

At 803, the method includes sending the stimulus signal to a tributary channel from a set of tributary channels (XI, XQ, YI, and YQ 141-144 in FIG. 1B) of the optical transponder. The controller (or the DSP) can select a tributary channel from a set of tributary channels of the optical transponder and send the stimulus signal to that tributary channel. The other tributary channels from the set of tributary channels do not receive an input signal. In some instances, the controller (or the DSP) can send a signal with a zero input to the other tributary channels. The output power from the other tributary channels is zero (or close to zero.)

At 805, the method includes setting a frequency of the stimulus signal to be a first frequency value from a set of frequency values. In some instances, the controller (or the DSP) can select a frequency value (3.g., 3.77 GHz) at a lower end of the range of the set of frequency values as the initial frequency value.

At 807, the method includes adjusting (or sweeping, or scanning) an amplitude of the stimulus signal between a first amplitude value (e.g., $N_{sig}$ is close 32 a.u.) from a set of amplitude values and a second amplitude value ($N_{sig}$ is close 127 a.u.) from the set of amplitude values. The method includes measuring an output optical power (i.e., total output power) of an optical signal, via a power meter (PM), output by the tributary channel. The PM sends, to the controller (or the DSP), a set of output optical power values in response to the amplitude of the stimulus signal being adjusted between the first amplitude value and the second amplitude value.

At step 809, the method includes determining whether the amplitude of the stimulus signal needs to be set to a value from the set of amplitude values. The controller (or the DSP) can adjust the amplitude if another amplitude value needs to be selected and return to step 807. If no other amplitude values needs to be set, at 811, the method includes performing curve fitting based on the set of output optical power values in response to the amplitude of the stimulus signal being adjusted between the first amplitude value and the second amplitude value. The controller (or the DSP) uses the average total output power in Eq. (6) and a curve fitting method (e.g., sequential quadratic programming (SQP)) to determine a value for each underlying fitting parameter by minimizing the root-mean-square error in Eq. (7). The underlying fitting parameters include the bandwidth limitation parameter $\alpha_\omega$, the modulation nonlinear parameter $\gamma_\omega$, the power imbalance parameter $P_{steady}$, and the bias parameter $\beta$.

At step 813, the method includes determining whether the set of frequency values (e.g., 3.77 GHz, 7.54 GHz, 11.3 GHz. 15.1 GHz, 18.8 GHz, 22.6 GHz, 26.4 GHz) has been set. If another frequency value (e.g., a second frequency value) is to be set, the method repeats steps 805-811 and includes measuring a second set of output optical power values in response to the amplitude of the stimulus signal being adjusted. The controller (or the DSP) determines a value for each underlying fitting parameter for each selected frequency value. In some instances, the controller (or the DSP) can determine the bandwidth limitation parameter $\alpha_\omega$ and the modulation nonlinear parameter $\gamma_\omega$ for each selected frequency value (e.g., 3.77 GHz, 7.54 GHz, 11.3 GHz. 15.1 GHz, 18.8 GHz, 22.6 GHz, 26.4 GHz) while using the previously-determined power imbalance parameter and the bias parameter $[P_{steady}, \beta]$ at lower frequency value (e.g., 3.77 GHz).

At 815, the method includes determining the bandwidth limitation based on the determined values of the bandwidth limitation parameter $\alpha_\omega$ for each selected frequency value. The bandwidth of the optical transponder can be defined as the attenuation between the total output power at a particular frequency of the stimulus signal and the total output power at a lower frequency (e.g., 3.77 GHz). The controller (or the DSP) determines a set of coefficients (e.g., $\alpha_0, \alpha_1, \alpha_2$) for the first filter (e.g., FIR filter) based on the bandwidth limitation and the set of determined values of the bandwidth limitation parameter $\alpha_\omega$. In response, the controller (or the DSP) sends a first signal to the first filter to set (or update) the set of coefficients for the first filter such that the bandwidth limitation of the optical transponder can be compensated.

At 817, the method includes determining the modulation nonlinearity (the nonlinear amplitude response component of the modulation nonlinearity effect) based on the determined value of the modulation nonlinear parameter $\gamma_\omega$ for each selected frequency value. The controller (or the DSP) determines a set of coefficients (e.g., $y, y^2, y^3$) for the second filter (e.g., a Volterra filter) based on the modulation nonlinearity and set of determined values of modulation nonlinear parameter $\gamma_\omega$. In response, the controller (or the DSP) sends a second signal to the second filter (e.g., the Volterra filter) to set (or update) the set of coefficients for the second filter such that the nonlinear amplitude response of the modulation nonlinearity can be compensated. In some implementations, the second filter include an 'aresin' function (also referred to as "a third filter") implemented, for example, in a look-up table in the DSP ASIC. The 'aresin' function (or the third filter) can compensate the transfer function of the MZM, thus reducing the modulation nonlinearity. In some instances, the measured and calculated values including the bandwidth limitation, nonlinear amplitude response, and the set of underlying fitting parameters, $[\alpha_\omega, \gamma_\omega, P_{steady}, \beta]$, steady, can be stored in the memory (such as the memory 194 in FIG. 1A; or an Electrically Erasable Programmable Read-Only Memory (EEPROM)) and used to set or update the filter values in the DSP ASIC. In other words, the controller (or the DSP) determines the bandwidth limitation independent from an impact of the modulation nonlinearity of the optical transponder and determines the effect nonlinear amplitude response independent from the effect of the transfer function of the MZM.

At 819, the method includes determining whether all tributary channels have been measured. If another tributary channel needs to be measured, the method returns to step 803 and repeats the steps 803-817 to determine the bandwidth limitation and the modulation nonlinearity for each tributary channel and update the first filter coefficients and the second filter coefficients for each tributary channel. In some implementations, a single power meter (such as the PM 122 in FIG. 1B) is coupled to the set of the tributary channels and thus the controller (or the DSP) sends the stimulus signal to a single tributary channel at a time (or in serial) and measures the output optical power of the optical signal from that tributary channel. In other implementations, each tributary channel from the set of tributary channels can be coupled to a power meter from a set of power meters and the controller (or the DSP) sends the stimulus signal to the set of tributary channels in parallel. Each PM from the set of PMs measures the output optical power from the tributary channel coupled to that PM and the measurements can be performed in parallel.

At step 813, the method includes switching the data path to live traffic data path such that the Tx optical module receives data signals from the DSP, and does not receive the stimulus signal (i.e., signal transmission phase). The data signals are compensated using the first filter and the second filter before being sent to the Tx optical module. In some instances, during the signal transmission phase, the RF amplifier can be switched to an automatic gain control (AGC) mode to compensate signal draft due to, for example, environmental changes.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or microinstructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. A method, comprising:
receiving a first plurality of output optical power values in response to (1) a stimulus signal being applied to a tributary channel from a set of tributary channels of a coherent optical transponder and (2) an amplitude of the stimulus signal being adjusted between a first amplitude value and a second amplitude value at a first time;
receiving a second plurality of output optical power values in response to the amplitude of the stimulus signal being adjusted between the first amplitude value and the second amplitude value at a second time after the first time;
determining, based on the first plurality of output optical power values and the second plurality of output optical power values, a bandwidth limitation associated with the tributary channel and a modulation nonlinearity associated with the tributary channel;
sending a first signal to a first filter of the coherent optical transponder to reduce the bandwidth limitation associated with the tributary channel; and
sending a second signal to a second filter of the coherent optical transponder to reduce the modulation nonlinearity associated with the tributary channel.

2. The method of claim 1, wherein:
a frequency of the stimulus signal is at a first frequency value from a plurality of frequency values at the first time;
the frequency of the stimulus signal is at a second frequency value from the plurality of frequency values at the second time.

3. The method of claim 1, further includes:
sending, to the tributary channel and prior to receiving the first plurality of output optical power values, the stimulus signal during a calibration mode of the coherent optical transponder.

4. The method of claim 1, wherein the bandwidth limitation is associated with a bandwidth limitation of at least one of an digital-to-analog converter (DAC) of the coherent optical transponder, a radio frequency (RF) amplifier of the coherent optical transponder, an optical modulator of the coherent optical transponder, a trace on a print circuit board of the coherent optical transponder, or a pluggable interface of the coherent optical transponder.

5. The method of claim 1, wherein the modulation nonlinearity is associated with a modulation nonlinearity of at least one of an digital-to-analog converter (DAC) of the coherent optical transponder, a radio frequency (RF) amplifier of the coherent optical transponder, an optical modulator of the coherent optical transponder, a trace on a print circuit board of the coherent optical transponder, or a pluggable interface of the coherent optical transponder.

6. The method of claim 1, wherein:
the determining the bandwidth limitation is based on a bandwidth limitation parameter;
the determining the modulation nonlinearity is based on a modulation nonlinearity parameter, the modulation nonlinearity parameter being different from the bandwidth limitation parameter.

7. The method of claim 1, wherein:
the determining the bandwidth limitation is independent from an impact of the modulation nonlinearity associated with the tributary channel.

8. The method of claim 1, wherein:
the first filter is a finite impulse response (FIR) filter of the coherent optical transponder.

9. The method of claim 1, wherein:
the second filter is a Volterra filter of the coherent optical transponder.

10. The method of claim 1, wherein:
the sending the second signal includes sending the second signal to the second filter of the coherent optical transponder to reduce the modulation nonlinearity from an optical modulator of the coherent optical transponder.

11. The method of claim 1, wherein:
the tributary channel is a first tributary channel from the set of tributary channels;
the method further includes determining a bandwidth limitation associated with a second tributary channel from the set of tributary channels in series or in parallel of determining the bandwidth limitation associated with the first tributary channel.

12. The method of claim 1, wherein the determining the bandwidth limitation includes determining the bandwidth limitation with no live data traffic.

13. The method of claim 1, further comprising:
switching between a calibration mode and a live-data-traffic mode;
receiving the stimulus signal while in the calibration mode; and
receiving data signals from the coherent optical transponder while in the live-data-traffic mode.

14. An apparatus, comprising:
a memory configured to store a stimulus signal having a plurality of amplitude values; and
a processor operatively coupled to the memory, the processor configured to:
receive a first plurality of output optical power values in response to (1) the stimulus signal being applied to a tributary channel from a set of tributary channels of a coherent optical transponder and (2) an amplitude of the stimulus signal being adjusted between a first amplitude value and a second amplitude value at a first time when a frequency of the stimulus signal is at a first frequency value from a plurality of frequency values;
receive a second plurality of output optical power values in response to the amplitude of the stimulus signal being adjusted between the first amplitude value and the second amplitude value at a second time after the first time when the frequency of the stimulus signal is at a second frequency value from the plurality of frequency values;
determine, based on the first plurality of output optical power values and the second plurality of output optical power values, a bandwidth limitation associated with the tributary channel and a modulation nonlinearity associated with the tributary channel;
send a first signal to a first filter of the coherent optical transponder to reduce the bandwidth limitation associated with the tributary channel; and
send a second signal to a second filter of the coherent optical transponder to reduce the modulation nonlinearity associated with the tributary channel.

15. The apparatus of claim 14, wherein:
the processor is configured to send, to the tributary channel and prior to receiving the first plurality of output optical power values, the stimulus signal during a calibration mode of the coherent optical transponder.

16. The apparatus of claim 14, wherein:
the processor is configured to determine the bandwidth limitation independent from an impact of the modulation nonlinearity associated with the tributary channel.

17. The apparatus of claim 14, wherein:
the memory is a random-access memory (RAM) in a digital signal processing chip of the coherent optical transponder.

18. A non-transitory processor-readable medium storing code representing instructions to be executed by a processor, the code comprising code to cause the processor to:
receive a first plurality of output optical power values in response to (1) a stimulus signal being applied to a tributary channel from a set of tributary channels of a coherent optical transponder and (2) an amplitude of the stimulus signal being adjusted between a first amplitude value and a second amplitude value at a first time;
receive a second plurality of output optical power values in response to the amplitude of the stimulus signal being adjusted between the first amplitude value and the second amplitude value at a second time after the first time;
determine, based on the first plurality of output optical power values and the second plurality of output optical power values, a bandwidth limitation associated with the tributary channel and a modulation nonlinearity associated with the tributary channel, the determining the bandwidth limitation being independent from an impact of the modulation nonlinearity associated with the tributary channel;
send a first signal to a first filter of the coherent optical transponder to reduce the bandwidth limitation associated with the tributary channel; and
send a second signal to a second filter of the coherent optical transponder to reduce the modulation nonlinearity associated with the tributary channel.

* * * * *